US006647864B1

(12) United States Patent
Fang

(10) Patent No.: US 6,647,864 B1
(45) Date of Patent: Nov. 18, 2003

(54) AUTOMATIC STIR-FRY MACHINE

(76) Inventor: Zhengming Fang, 228 N. Nevada Way, Gilbert, AZ (US) 85233

( * ) Notice: Subject to any disclaimer, the term of this patent is extended or adjusted under 35 U.S.C. 154(b) by 0 days.

(21) Appl. No.: 10/356,229

(22) Filed: Jan. 31, 2003

(51) Int. Cl.[7] .............................. A23L 1/00; A47J 27/00; A47J 27/14; A47J 36/16; A47J 43/044
(52) U.S. Cl. ............................ 99/327; 99/332; 99/342; 99/348; 99/352; 99/357
(58) Field of Search .................... 99/325–334, 352–355, 99/341, 342, 357, 348, 443 C, 443 R, 485, 486; 426/231–233, 520, 523, 519, 438; 219/400, 413, 490, 491, 494; 366/144–146, 310, 192, 313, 281, 319, 320, 329.3, 330.4; 700/90

(56) References Cited

U.S. PATENT DOCUMENTS

| | | | |
|---|---|---|---|
| 2,011,699 A | * | 8/1935 | Amend ........................ 366/313 |
| 3,635,147 A | * | 1/1972 | Lee .............................. 99/348 |
| 4,274,751 A | * | 6/1981 | Rector et al. ................ 366/310 |
| 4,503,502 A | | 3/1985 | Chapin |
| 4,649,810 A | | 3/1987 | Wong |
| 4,700,617 A | | 10/1987 | Lee |
| 4,821,631 A | | 4/1989 | Wong |
| 4,919,950 A | | 4/1990 | Mak |
| 4,942,807 A | * | 7/1990 | Wong ........................... 99/348 |
| 5,613,425 A | * | 3/1997 | Krznaric ...................... 99/348 |
| 6,112,645 A | | 9/2000 | Chang |
| 6,234,065 B1 | * | 5/2001 | Su ............................... 99/341 |
| 6,331,323 B1 | | 12/2001 | Adler-Nissen |

FOREIGN PATENT DOCUMENTS

EP 0325865 B1 8/1989

* cited by examiner

Primary Examiner—Timothy F. Simone
(74) Attorney, Agent, or Firm—Thomas I. Rozsa; Tony D. Chen

(57) ABSTRACT

An automatic stir-fry machine to be placed on a commercial burner for cooking stir-fry dishes. The automatic stir-fry machine has a closed cooking chamber with only a rear exhaustion port, containing a cooking vessel formed primarily by two oppositely spaced apart vertical sidewalls and a generally cylindrical shaped bottom having a horizontal axis. A slice assembly is supported inside the cooking vessel and rotates about the horizontal axis of the cylindrical bottom of the cooking vessel, including a transverse scraping slice contacting the bottom of the cooking vessel with spring tension, and a pair of oppositely spaced apart and diagonally oriented stirring slices contacting opposite corners of the cooking vessel where the cylindrical bottom and the sidewalls join, for stirring, tossing and mixing food items inside the cooking vessel. A multiplicity of storage and delivery systems are provided for containing ingredients and condiments and dispensing pre-determined amounts of the ingredients and condiments into the cooking vessel at pre-determined times for cooking the stir-fry dishes. The automatic cooking operation of the automatic stir-fry machine can be controlled by a micro-processor unit.

46 Claims, 20 Drawing Sheets

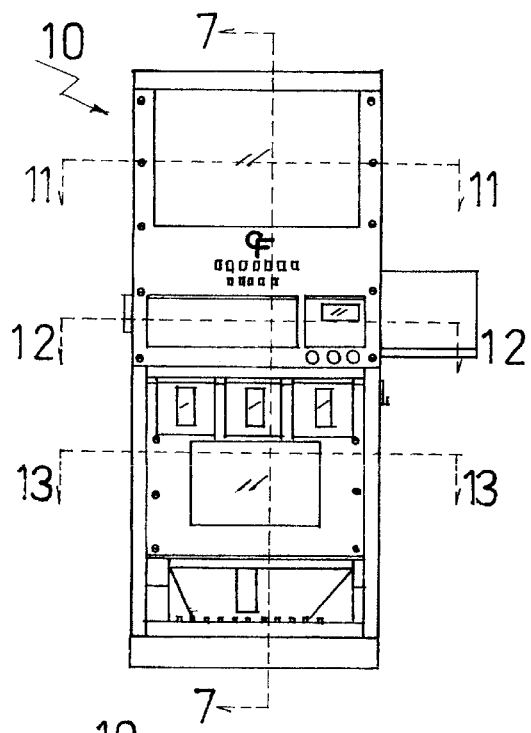
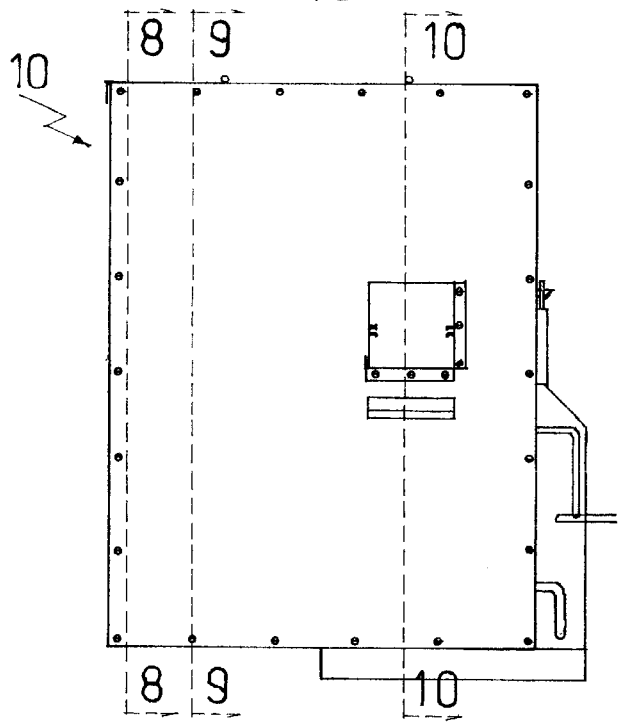
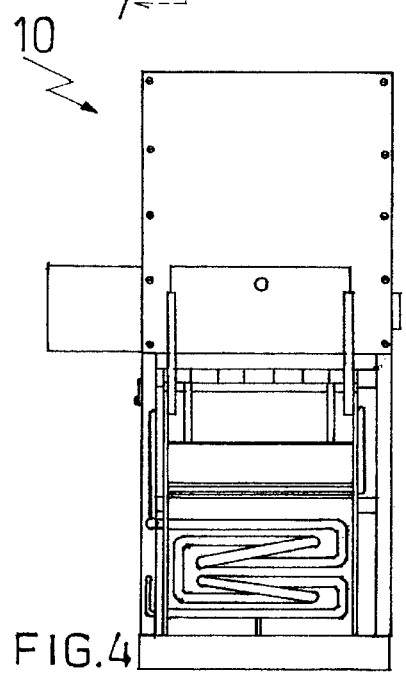
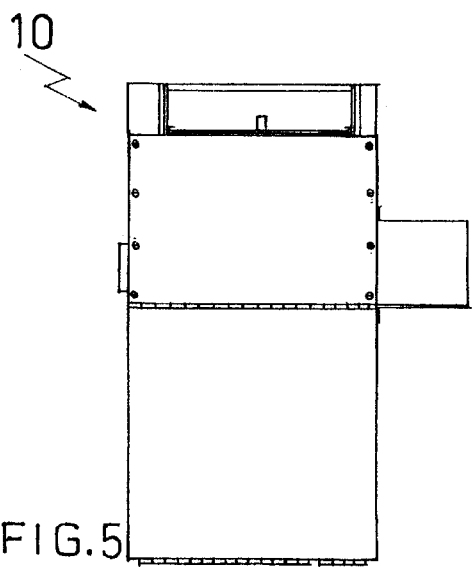

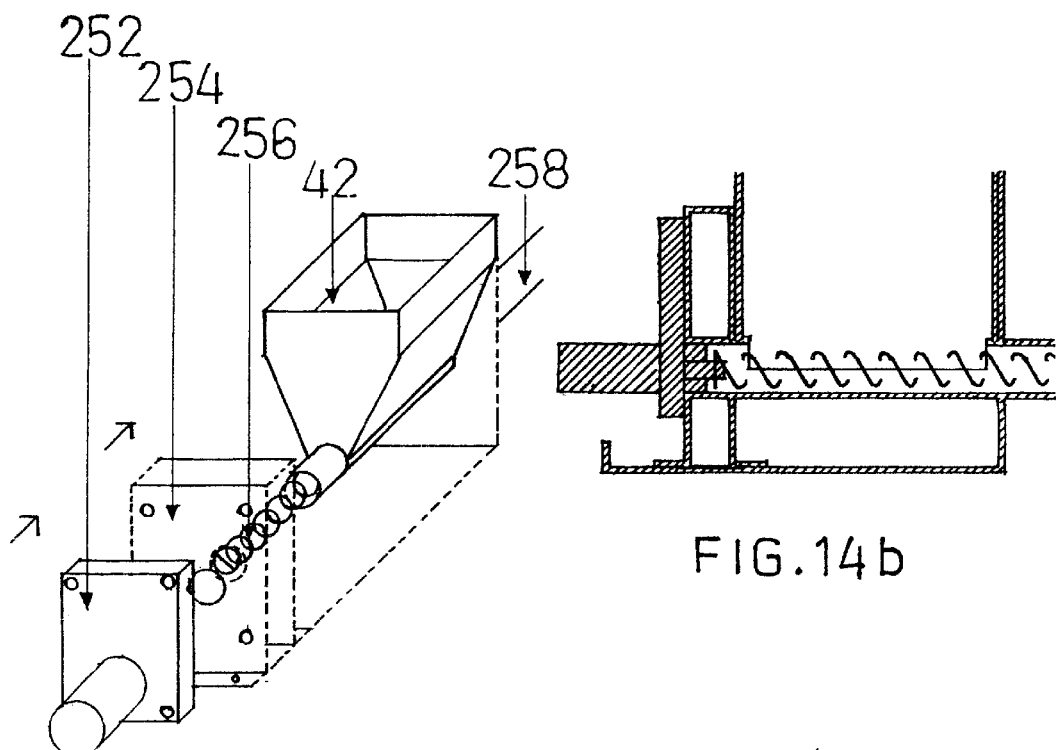
FIG.14a
FIG.14b
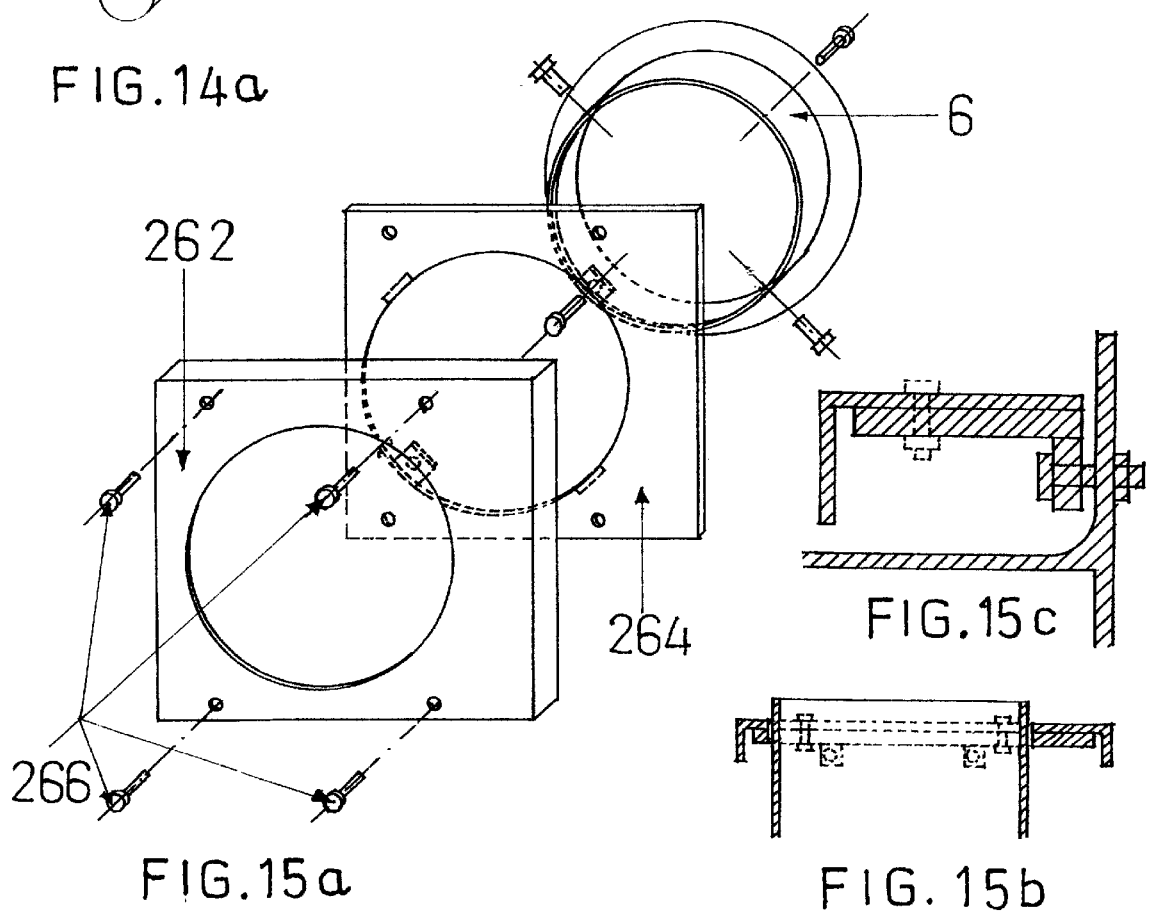
FIG.15a
FIG.15b
FIG.15c

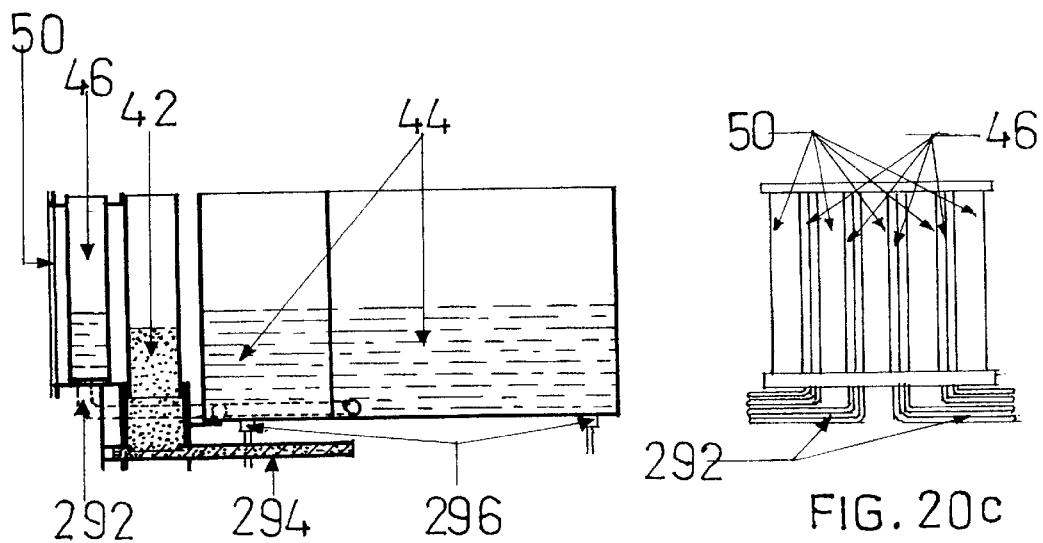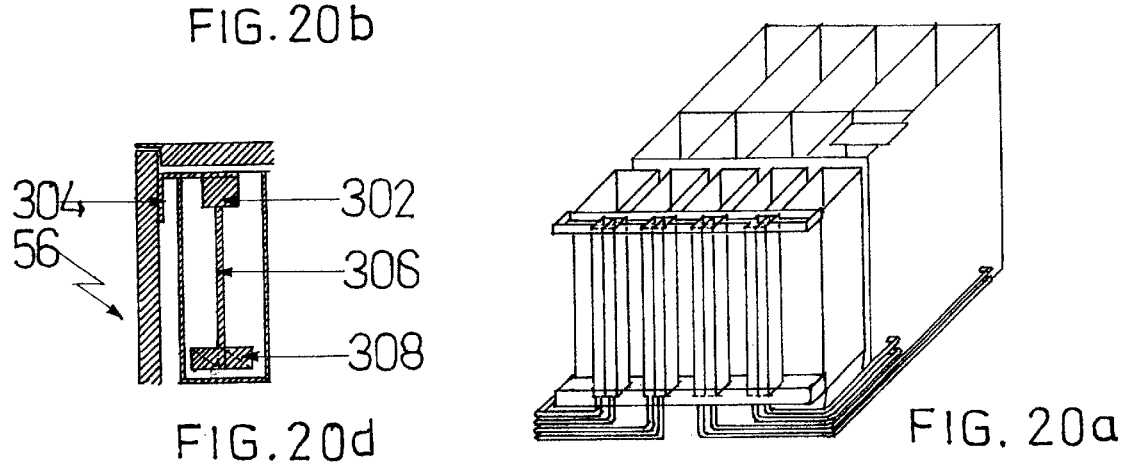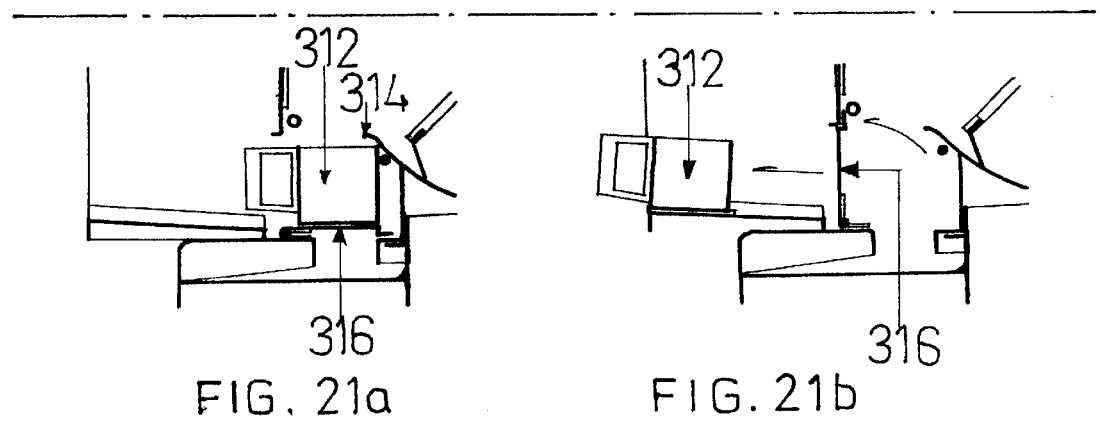

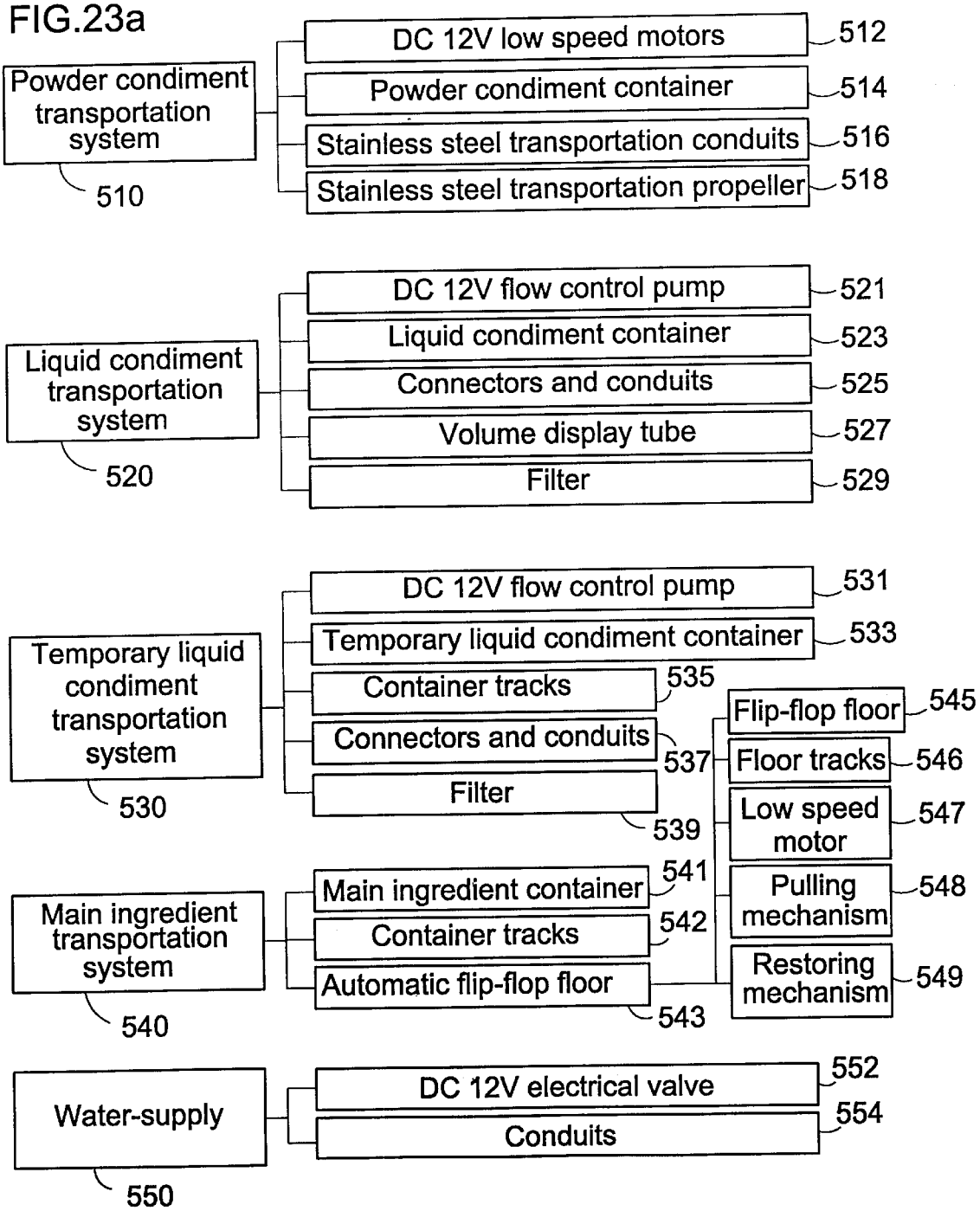

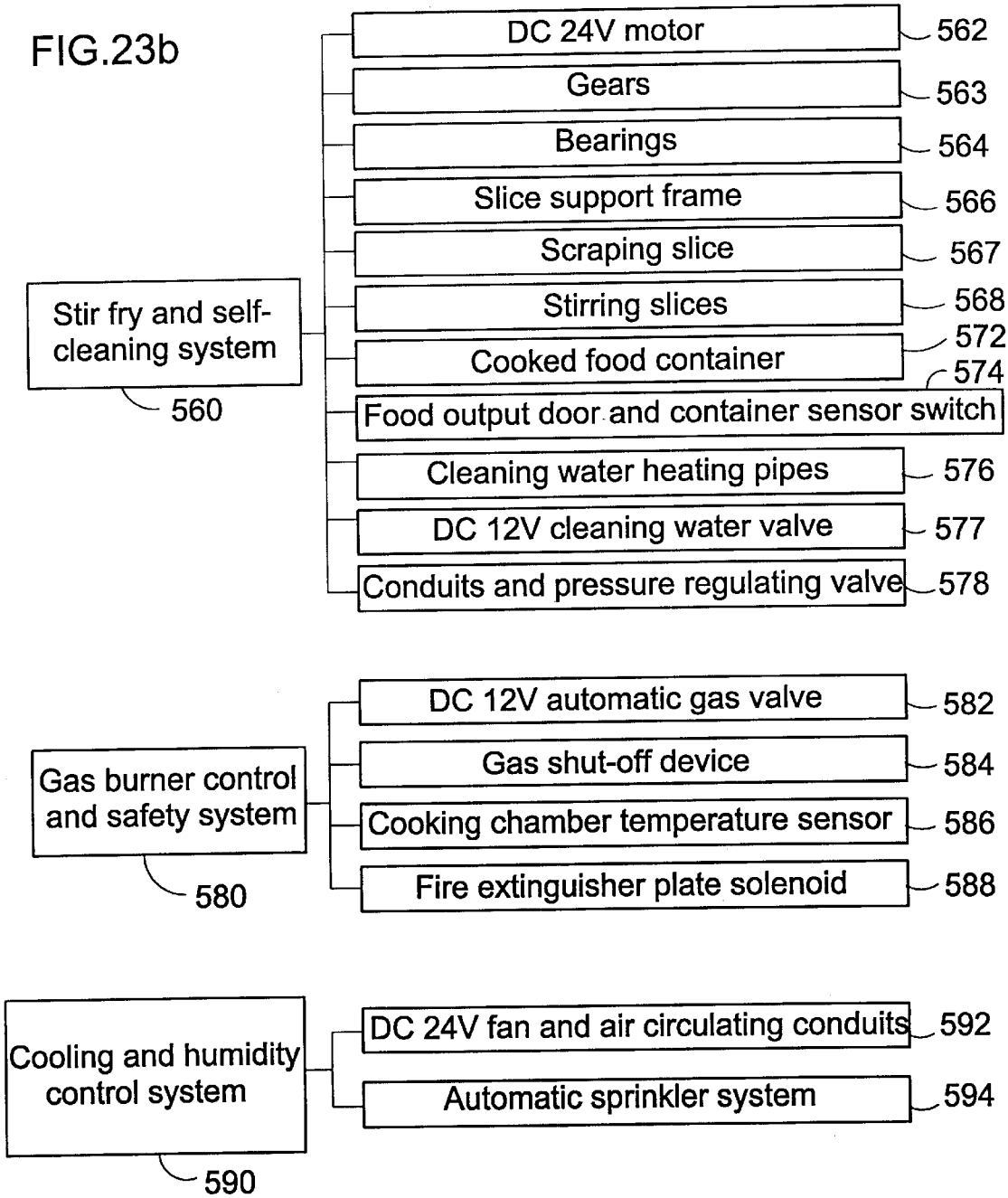

AUTOMATIC STIR-FRY MACHINE

BACKGROUND OF THE INVENTION

1. Field of the Invention

The present invention generally relates to the field of food preparation apparatus and more particularly to the technical field of automatic stir-fry machines for cooking Chinese or oriental stir-fry dishes.

2. Description of the Prior Art

Many traditional Chinese or oriental dishes are stir-fry dishes that require unique manual preparation by specially trained chiefs whose training, skills and experience vary significantly. As a result, it is very hard to maintain a uniform quality, taste and standard among different Chinese or oriental food restaurants (and sometimes even within the same restaurant). While automatic food preparation apparatus have been introduced in the past, and some were specially designed for cooking Chinese dishes, various problems and drawbacks have hindered their commercial viability and success. Today, Chinese and oriental dishes are still mainly cooked manually by chiefs.

The following patents and patent applications are believed to be pertinent to this field of art:

1. U.S. Pat. No. 4,503,502 issued to Chapin on Mar. 5, 1985 for "Method and Apparatus for Automated Chinese Stir-Fry, Cooking" (hereafter the "Chapin Patent");
2. U.S. Pat. No. 4,649,810 issued to Wong on Mar. 17, 1987 for "Automatic Cooking Apparatus" (hereafter the "Wong '810 Patent");
3. U.S. Pat. No. 4,700,617 issued to Lee on Oct. 20, 1987 for "Automatic Frying Machine" (hereafter the "Lee Patent");
4. U.S. Pat. No. 4,821,631 issued to Wong on Ap. 18, 1989 for "Cooking Food Device" (hereafter the "Wong '631 Patent");
5. U.S. Pat. No. 4,919,950 issued to Mak on Apr. 24, 1990 for"Computer Controlled, Fully Automatic, Short-Order Wok Cooking System for Preparing Stir-Fried Chinese Food" (hereafter the "Mak Patent");
6. U.S. Pat. No. 6,112,645 issued to Chang on Sep. 5, 2000 for "Automatic Cooking Machine" (hereafter the "Chang Patent");
7. U.S. Pat. No. 6,331,323 B1 issued to Adler-Nissen on Dec. 18, 2001 for "Method and Apparatus for Stir-Frying" (hereafter the "Adler-Nissen Patent");
8. European Publication No. 0,325,865 B1 published on Aug. 2, 1989 for "Stirring Mechanism" (hereafter "EPO Publication").

The Chapin Patent discloses a method and apparatus for cooking Chinese stir-fry dishes. It includes means for entering and storing recipe data in a computer control system, means for selecting a recipe from a displayed menu, and means for cooking the selected recipe automatically by the computer control system including addition of food and liquid ingredients at proper intervals, temperature control throughout the cooking process, stirring of the cooking food, and timing of the cooking process, all according to the recipe selected.

The Wong '810 Patent discloses a microcomputer-controlled, integrated cooking apparatus for automatically preparing culinary dishes. The constituent ingredients of a particular dish are loaded into a compartmentalized carousel, which is mounted on the cooking apparatus. The apparatus includes a memory for storing one or more recipe programs. The recipe program specifies schedules for dispensing the ingredients from the carousel into a cooking vessel, for heating the vessel (either covered or uncovered), and for stirring the contents of the vessel. These operations are performed automatically under control of the microcomputer.

The Lee Patent discloses an automatic frying machine, including a feeder device to place materials automatically into a pan, a frying and stirring device and a mechanism to turn the pan for the purpose of serving the prepared food the machine does pan washing with a stirrer and water injectors which automatically inject water. The device can be operated in a single process with the operations including material feeding, frying, serving and pan washing.

The Wong '631 Patent discloses a food cooking device for cooking oriental dishes is disclosed comprising a base and a cooking pan support means pivoted to the base. It has an acceleration and deceleration means for rapidly accelerating upwardly from a starting position to at least the rear portion of the support means at an initial high velocity followed by a subsequent rapid deceleration, whereby when the cooking pan is positioned on the support means, it will move upwardly with the support means and propel food placed therein into the air upon rapid deceleration of the support means.

The Mak Patent discloses a computer controlled, fully automatic wok cooking system prepares stir-fried Chinese dishes according to arbitrarily selected customer orders entered at a point-of-sale computer. The computer integrates the operation of the conveyer, cooking, dispensing, and point of sale entry devices according the order, menu and ingredients. A conveyor belt including a plurality of woks draws the woks through a plurality of cooking stations. Each station is provided with a burner or heating element and a dispensing station controlled by the computer according to the customer enter order. Oil or condiments are added at a first station by a corresponding plurality of dispensers and at subsequent cooking stations the food ingredients are either stirred or additional spices, food ingredients and condiments added by corresponding dispensers. At the last cooking station, additional food ingredients, such a vegetables, nuts or other ingredients requiring shorter cooking times, are added and cooking is completed. The completed short order stir-fried dish is then delivered to a serving container at a delivery station. The emptied wok is advanced by the conveyor system through a plurality of cleaning stations, where the wok is inverted, washed, scoured, rinsed and dried. The cleaned and dried wok is then returned by the conveyor system to the initial cooking station to begin the cooking process again according to the then appropriate customer order.

The Chang Patent discloses an automatic cooking machine includes a feeding device, a deep-fry device, stove device, a cooker transmission device, a serving device, a washing device, a stir-fry device and a panel each mounted on a base. A program logic controller corresponding with micro-switches and photoelectric sensors controls each of the devices to carry out an automatic cooking process.

The Adler-Nissen Patent discloses a method and apparatus for stir-frying discrete pieces or particles of one or more foodstuffs by heating a surface and bringing discrete pieces into contact with the heated surface through an inlet means, transporting said discrete pieces across the heated surface by means of a mechanically driven stirring means and scraping means in the form of a helix, the discrete pieces being stirred such that the orientation of same with respect to the heated surface is altered such that the various surface portions of the discrete pieces are brought into heat conducting contact with the heated surface, at the same time scraping the heated surface by means of the rim of the helix or by means of special scraping and stirring elements arranged along the rim of the helix such that the entire area of the heated surface contacted by the discrete pieces is scraped mechanically so as to remove any layer of material originating from the foodstuffs and adhering to the heated surface and finally, removing the discrete pieces from contact with the heated surface through an outlet means.

The EPO Publication essentially disclosed the same apparatus as disclosed in the Wong '810 Patent.

It is still desirable to create and design an automatic cooking machine for preparing Chinese or oriental stir-fry dishes in a clean, expeditious and uniform manner.

SUMMARY OF THE INVENTION

The present invention is an automatic stir-fry machine for cooking Chinese or oriental dishes.

In summary, the present invention is an automatic stir-fry machine to be placed on a commercial burner for cooking stir-fry dishes. The automatic stir-fry machine includes an adaptor assembly for mounting the automatic stir-fry machine on the burner, forming a closed combustion chamber under the automatic stir-fry machine with only a rear exhaustion port. The automatic stir-fry machine has a closed cooking chamber in a lower portion of the automatic stir-fry machine with only a rear exhaustion port, containing a cooking vessel formed primarily by two oppositely spaced apart vertical sidewalls and a generally cylindrical shaped bottom having a horizontal axis. A slice assembly is supported inside the cooking vessel and rotatable about the horizontal axis of the cylindrical bottom of the cooking vessel, including a transverse scraping slice contacting the bottom of the cooking vessel with spring tension, and a pair of oppositely spaced apart and diagonally oriented stirring slices contacting opposite corners of the cooking vessel where the cylindrical bottom and the sidewalls join, for stirring, tossing and mixing food items inside the cooking vessel. The automatic stir-fry machine also has various storage and delivery systems located in an upper portion of the automatic stir-fry machine for containing ingredients and dry or liquid condiments and dispensing pre-determined amounts of the ingredients and condiments into the cooking vessel at pre-determined times for cooking the stir-fry dishes. The automatic stir-fry machine further includes a micro-controller located in a front portion of the automatic stir-fry machine for controlling the automatic cooking operation of the automatic stir-fry machine.

The present invention automatic stir-fry machines is very unique and advantageous. It automates the cooking process of Chinese stir-fry dishes with the aid of a microprocessor controller that allows the operator to select the dish (and quantity) to be cooked from an extensive menu and then starts the cooking process automatically. The automatic stir-fry machine has large capacity storage chambers for main ingredients, and various containers for powdered or liquid condiments with display windows or level indicators that are under the control of the microprocessor controller for precise and timely delivery of the ingredients and condiments which ensure the uniformity of the taste, quality and standard of the cooked dishes. It is designed to be placed on a commercial burner and has a closed cooking chamber that improves energy efficiency. It also has a uniquely designed cooking vessel and slice assembly that increases the effectiveness of mixing and stirring of the food being cooked in the cooking vessel. The automatic stir-fry machine is further equipped with an automatic cleaning system and multiple fire-extinguishing safety systems.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a front elevation view of the preferred embodiment of the present invention automatic stir-fry machine shown in FIG. 1;

FIG. 3 is a side elevation view of the preferred embodiment of the present invention automatic stir-fry machine shown in FIG. 1;

FIG. 4 is a back elevation view of the preferred embodiment of the present invention automatic stir-fry machine shown in FIG. 1;

FIG. 5 is a top plane view of the preferred embodiment of the present invention automatic stir-fry machine shown in FIG. 1;

FIG. 14a is a perspective view of a preferred embodiment of the powder/particles condiment storage chamber of the present invention automatic stir-fry machine;

FIG. 14b is a perspective view of a preferred embodiment of the powder/particles condiment delivery mechanism of the present invention automatic stir-fry machine;

FIG. 15a is an exploded perspective view of a preferred embodiment of the burner attachment assembly of the present invention automatic stir-fry machine;

FIG. 15b is a partial cross-sectional view of the burner attachment assembly shown in FIG. 15a;

FIG. 15c is another partial cross-sectional view of the burner attachment assembly shown in FIG. 15a;

FIG. 18b is a top plane view of the preferred embodiment of the cooking vessel and slice assembly shown in FIG. 18a;

FIG. 18c is a top cross-sectional view of the preferred embodiment of the cooking vessel and slice assembly shown in FIG. 18a;

FIG. 19b is a partial exploded view of the preferred embodiment of the cooking chamber shown in FIG. 19a;

FIG. 19c is a partial side cross-sectional view of the preferred embodiment of the cooking chamber shown in FIG. 19a;

FIG. 20a is a perspective view of a preferred embodiment of the condiments storage and delivery system of the present invention automatic stir-fry machine;

FIG. 20b is a side cross-sectional view of the preferred embodiment of the condiments storage and delivery system sown in FIG. 20a;

FIG. 20c is a front elevation view of the preferred embodiment of the condiments storage and delivery system sown in FIG. 20a;

FIG. 20d is a partial side cross-sectional view of a preferred embodiment of the starch mixer of the condiments storage and delivery system;

FIG. 21a is a side elevation view of a preferred embodiment of the cooked dish delivery system of the present invention automatic stir-fry machine, showing the cooked food container in its inserted position;

FIG. 21b is a side elevation view of a preferred embodiment of the cooked dish delivery system of the present invention automatic stir-fry machine, showing the cooked food container in its withdrawn position;

FIGS. 23a and 23b form an illustrative block diagram showing the main structural and operational components of a preferred embodiment of the present invention automatic stir-fry machine.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described in general, the present invention is an automatic stir-fry machine to be placed on a commercial burner for cooking stir-fry dishes. The automatic stir-fry machine includes an adaptor assembly for mounting the automatic stir-fry machine on the burner, forming a closed combustion chamber under the automatic stir-fry machine with only a rear exhaustion port. The automatic stir-fry machine has a closed cooking chamber in a lower portion of the automatic stir-fry machine with only a rear exhaustion port, containing a cooking vessel formed primarily by two oppositely spaced apart vertical sidewalls and a generally cylindrical shaped bottom having a horizontal central axis. It also has a slice assembly supported inside the cooking vessel and having a transverse scraping slice contacting the bottom of the cooking vessel with spring tension, and a pair of oppositely spaced apart and diagonally oriented stirring slices contacting opposite comers of the cooking vessel where the cylindrical bottom and the sidewalls join, the scraping and stirring slices rotatable about the horizontal central axis of the cylindrical bottom of the cooking vessel in one direction for stirring, tossing and mixing food items being cooked in the cooking vessel and also in a reverse direction for outputting cooked food items from the cooking vessel. There are a multiplicity of storage and delivery systems located in an upper portion of the automatic stir-fry machine for containing ingredients and condiments and dispensing pre-determined amounts of the ingredients and condiments into the cooking vessel at pre-determined times for cooking the stir-fry dishes. A combustion control and safety system is provided which has an automatic fire extinguish assembly for closing the exhaust port of the cooking chamber in case of fire inside the cooking chamber. The automatic cooking operation of the automatic stir-fry machine is controlled by a micro-controller unit located in a front portion of the automatic stir-fry machine. Input devices are connected to the micro-processor unit for loading computer software programs and allowing an operator to input instructions and make selections.

Figure 1:
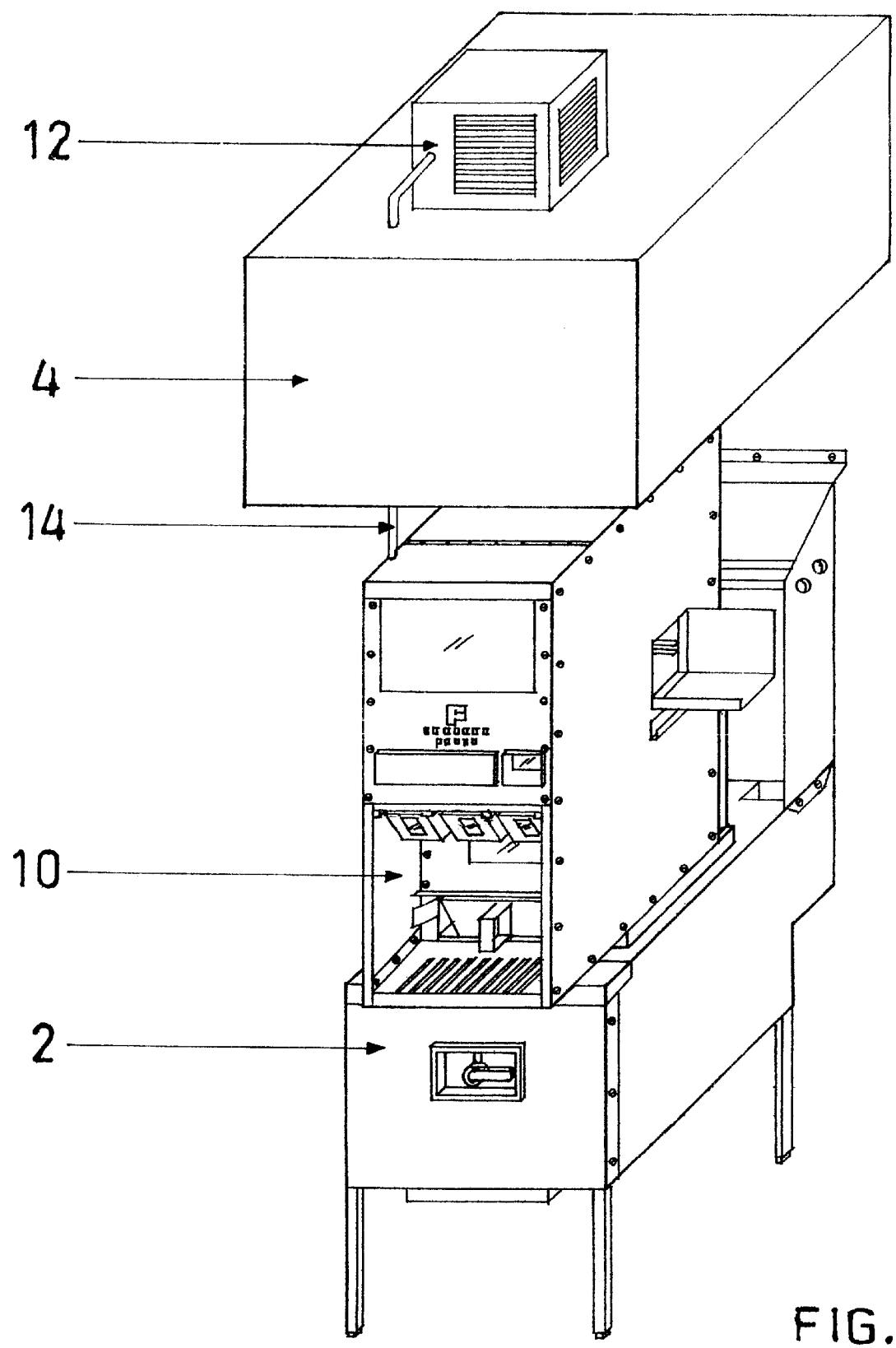
FIG. 1 is a perspective view of one of the preferred embodiments of the present invention automatic stir-fry machine.

Referring to FIG. 1, there is shown at 10 a preferred embodiment of the present invention automatic stir-fry machine placed on a commercial burner 2. The present invention automatic stir-fry machine 10 has a power unit and a cooling system that has a compressor, which power unit and compressor are located in a separate compartment 12 which may be installed on the existing hood/fan 4 above the burner 2. The power unit and the compressor of the cooling system contained in the separate compartment 12 are connected to the main portion of the automatic stir-fry machine 10 through a conduit 14 which houses the power cords and coolant pipes between the separate compartment and the main portion of the automatic stir-fry machine 10.

Figure 6:
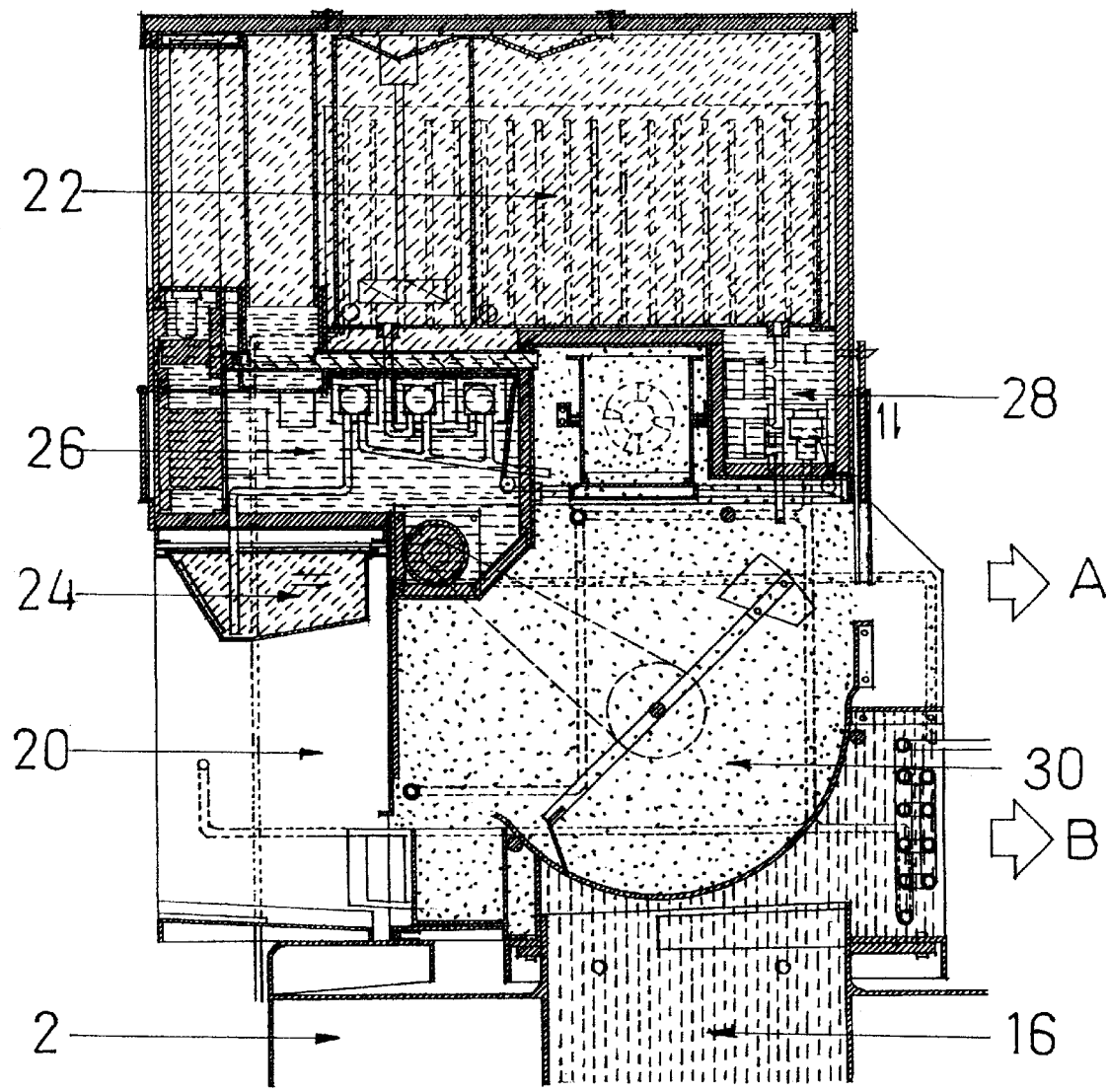
FIG. 6 is an exposed side elevation view of the preferred embodiment of the present invention automatic stir-fry machine shown in FIG. 1, showing its main structural and functional components.

Referring to FIGS. 1 through 6, particularly FIG. 6, when the present invention automatic stir-fry machine 10 is placed over the burner 2, a combustion chamber 16 is formed between the burner 2 and the bottom of the automatic stir-fry machine 10.

The automatic stir-fry machine 10 include an operating area 20, a refrigerated storage compartment 22, a non-refrigerated storage compartment 24, a front control and mechanical compartment 26, a rear mechanical compartment 28, and a cooking chamber 30. The combustion chamber 16 is formed directly under the cooking chamber 30. The cooking chamber has an exhaust port as indicated by the arrow A for exhaustion of the oil, gas and vapor from the cooking chamber 30. The combustion chamber 16 also has an exhaust port as indicated by the arrow B for exhaustion of hot air with residual heat from the combustion chamber 16.

Figure 7:
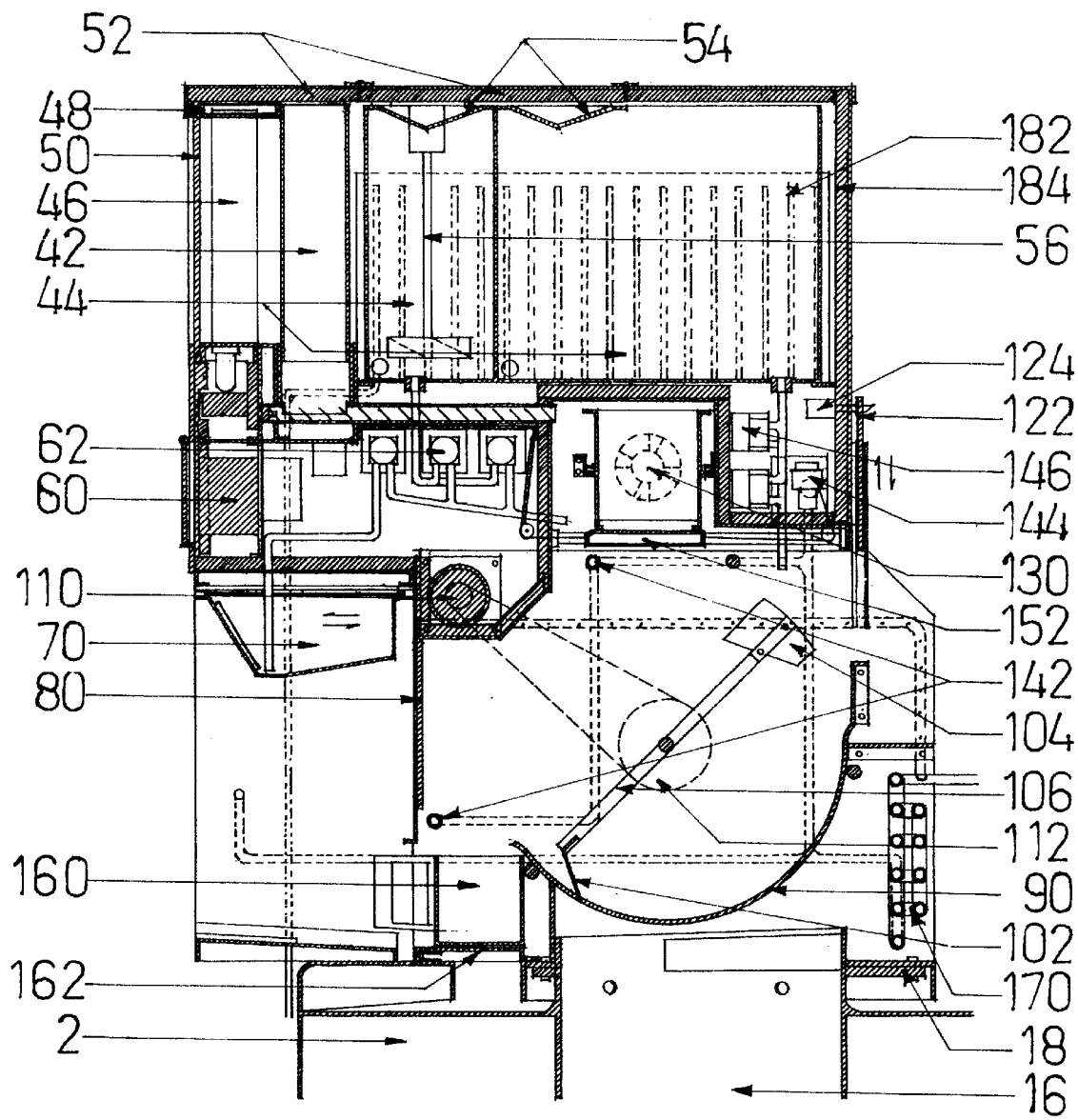
FIG. 7 is a side cross-sectional view of the preferred embodiment of the present invention automatic stir-fry machine shown in FIG. 1, taken along line 7—7 of FIG. 2.
Figure 8:
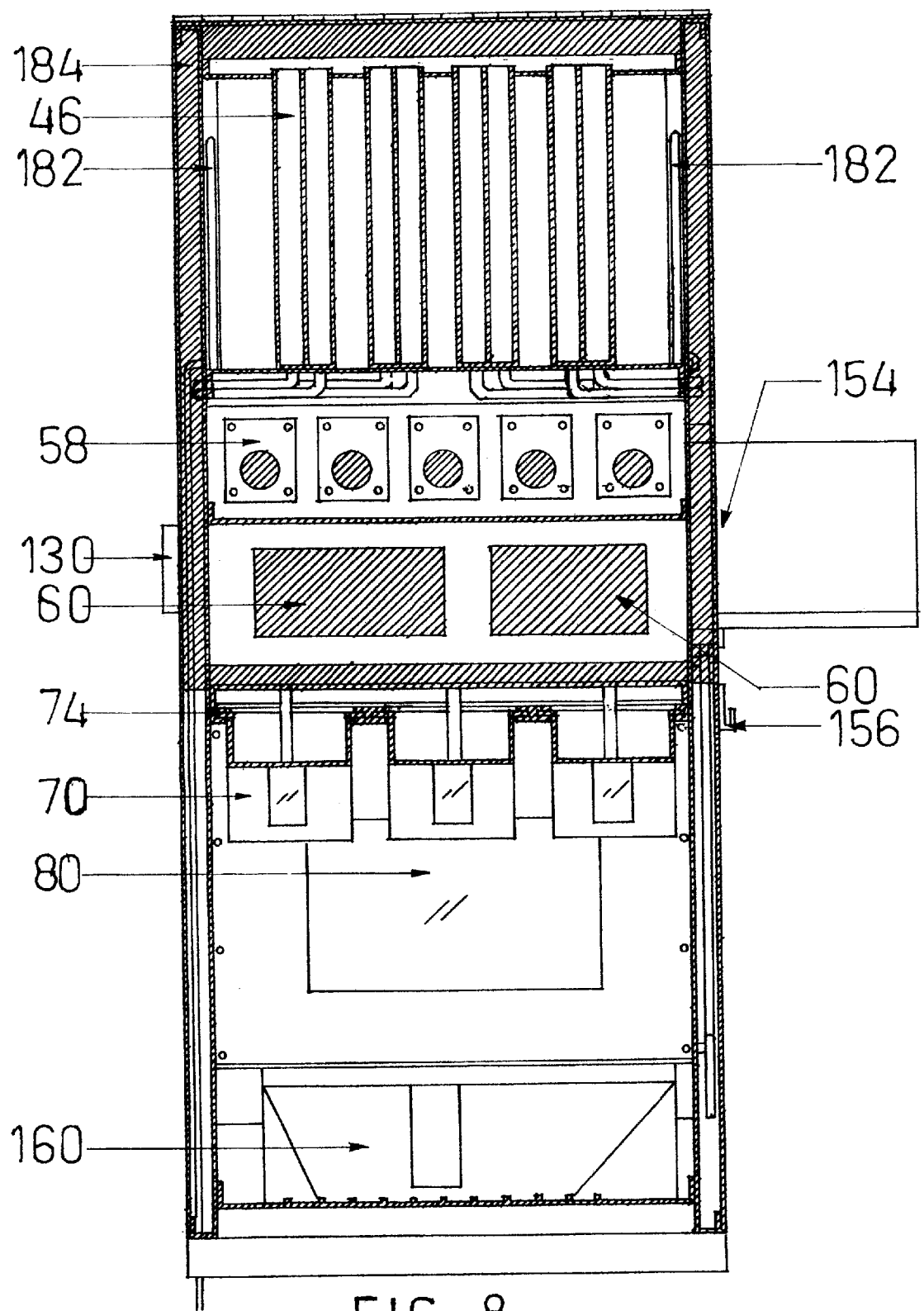
FIG. 8 is a front cross-sectional view of the preferred embodiment of the present invention automatic stir-fry machine shown in FIG. 1, taken along line 8—8 of FIG. 3.
Figure 9:
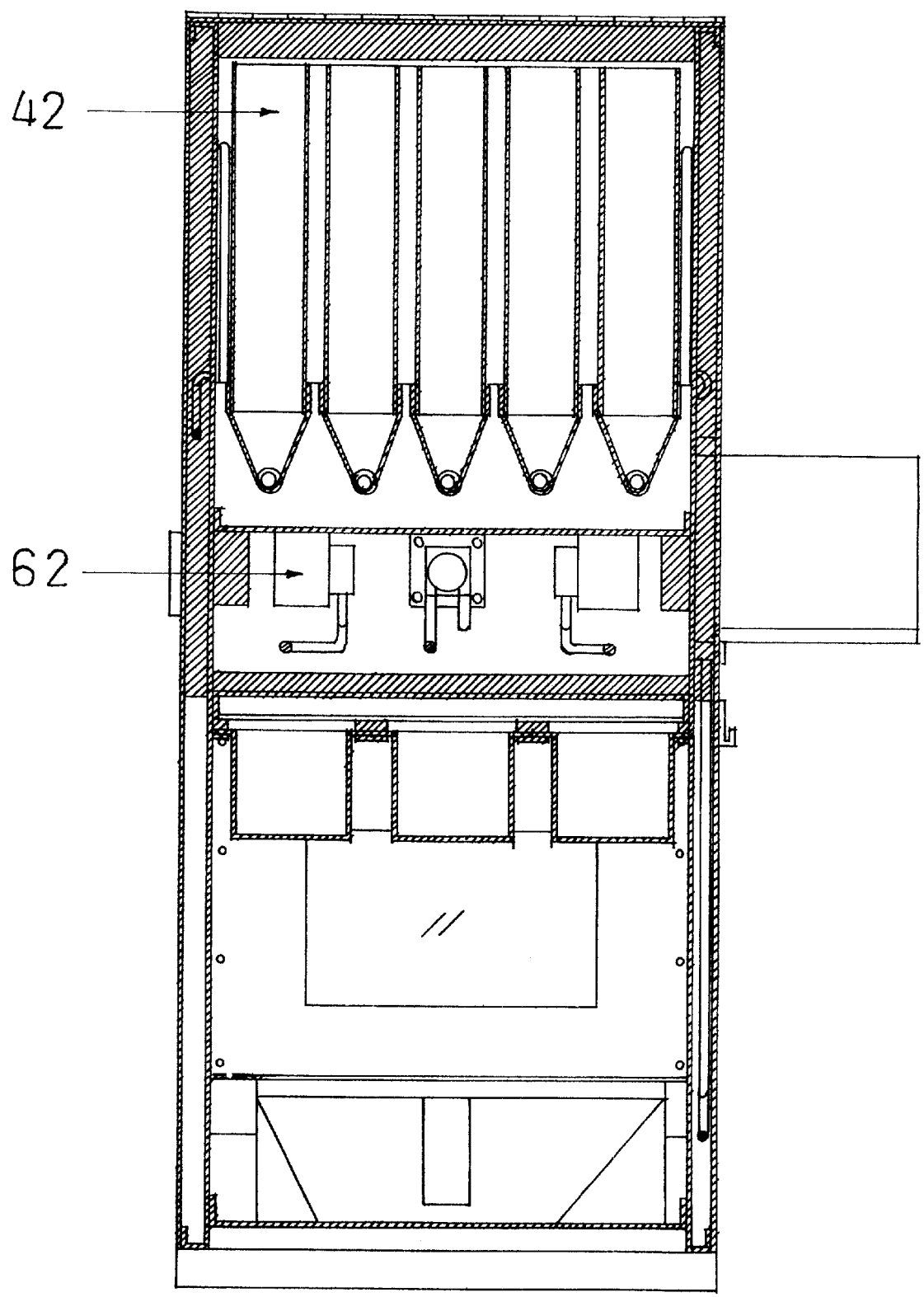
FIG. 9 is also a front cross-sectional view of the preferred embodiment of the present invention automatic stir-fry machine shown in FIG. 1, taken along line 9—9 of FIG. 3.

Referring to FIGS. 1 through 13, particularly FIG. 7, the present invention automatic stir-fry machine 10 has an adapter 18 for connection with the existing burner 2, which forms the combustion chamber 16 directly under the cooking chamber 30.

The present invention automatic stir-fry machine 10 includes a multiplicity of containers 42 for storage of powdered and/or particle formed dry condiments, and a multiplicity of containers 44 for storage of liquid condiments. The powder/particle condiment containers 42 and the liquid condiment containers 44 are located in the refrigerated storage compartment 22, so that the powder/particle and liquid condiments are stored in a cooling environment.

A multiplicity of display tubes 46, each in fluid communication with a respective one of the liquid condiment containers 44, are placed in front of the refrigerated storage compartment 22 for indicating the liquid level in the liquid condiment containers 44. An over-flow conduit 48 is provided in connection with the display tubes 46 to provide an over-flow protection to the liquid condiment containers 44 and the display tubes 46.

Through a front transparent observation window 50, an operator can observe the amount of condiments remain in the powder/particle condiment containers 42 and the liquid condiment containers 44.

Movable lids or covers 52 are provide over the powder/particle condiment containers 42 and the liquid condiment containers 44 for quick and easy addition of condiments into these containers. For the liquid condiment containers 44, filter meshes are added under the lids or covers for filtrating the liquid condiments added to the liquid condiment containers 44.

One of the liquid condiment containers 44 is to be used for containing starch mixture which often requires constant stirring. For this purpose a starch stirrer 56 is provided in that container.

A set of motors 58 for delivery of powder/particle condiments are located under the powder/particle condiment containers 42, in the front control and mechanical compartment 26. One or more microprocessor controllers 60 are also located in the front control and mechanical compartment 26, along with a set of flow-control pumps 62 for delivery of the liquid condiments.

A multiplicity of temporary liquid condiment containers 70 are provided under the front control and mechanical compartment 26 for storage of temporary liquid condiments that may be needed to cook certain special dishes. Each temporary liquid condiment container 70 is suspended on a pair of tracks 74 such that it can be slid in and out for quick and easy refill of the liquid condiment contained in temporary liquid condiment container 70 by the operator depending on the requirement for the particular dish to be cooked.

Below the temporary liquid condiment containers 70 is the operating area 20 where another transparent observation window 80 is provided in front of the cooking chamber 30 for the operator to observe the operation in the cooking chamber 30.

A cylindrical shaped cooking vessel 90 is located in the cooking chamber 30, directly above the combustion chamber 16. Inside the cooking vessel 90 there is a slice assembly which includes a scraping slice 102 and two stirring slices 104 supported by a slice frame 106. The slices 102 and 106 are rotated together with the slice frame 106 about a transverse central shaft by a motor 110 through a gear and chain assembly 112.

An automatic fire-extinguish plate 122 is provided at the exhaustion port A of the cooking chamber 30 for quickly isolate the cooking chamber 30 in case of a fire inside the cooking chamber 30. The automatic fire-extinguish plate 122 is operated by a solenoid 124 which may be connected to a sensor device to release the automatic fire-extinguish plate 122 upon the detection of fire inside the cooking chamber 30.

One or more air circulation fans 130 are provided above the cooking chamber 30 near the rear of the automatic stir-fry machine 10.

A set of clean water pipes and nozzles 142 are located inside the cooking chamber 30 for rinsing and cleaning the cooking chamber 30. The water supply is controlled by water valves 144 and control pumps 146 located in the rear mechanical compartment 28. The cooking chamber 30 may be automatically rinsed and washed each time after a dish is cooked.

The automatic stir-fry machine 10 has several main ingredient containers 150 for storage of main ingredients of the dishes to be cooked, such as meats and vegetables. The sliding movement of the main ingredient containers 150 are guided by sliding tracks 174. The main ingredients of the dish to be cooked enter the cooking chamber through automatic main ingredient doors 152. The main ingredients can be added to their containers through entrance port 154. Hangers 156 are also provided for hanging main ingredient funnels.

Once the dish is cooked, the cooked food is disposed in a cooked food container 160 which can be inserted next to the cooking vessel through a food delivery door 162 which is an automatic flip-flop plate.

The cleaning water pipes 142 are connected to a set of pipes 170 which are located at the exhaustion port B of the combustion chamber 16 for utilizing the residual heat from the combustion chamber 16.

Cooling plates 182 are provided in the refrigerated storage compartment 22 to function as heat sinks. To help maintaining low temperature in the refrigerated storage compartment 22, the refrigerated storage compartment 22 is further insulated by heat insulation layers 184.

Figure 10:
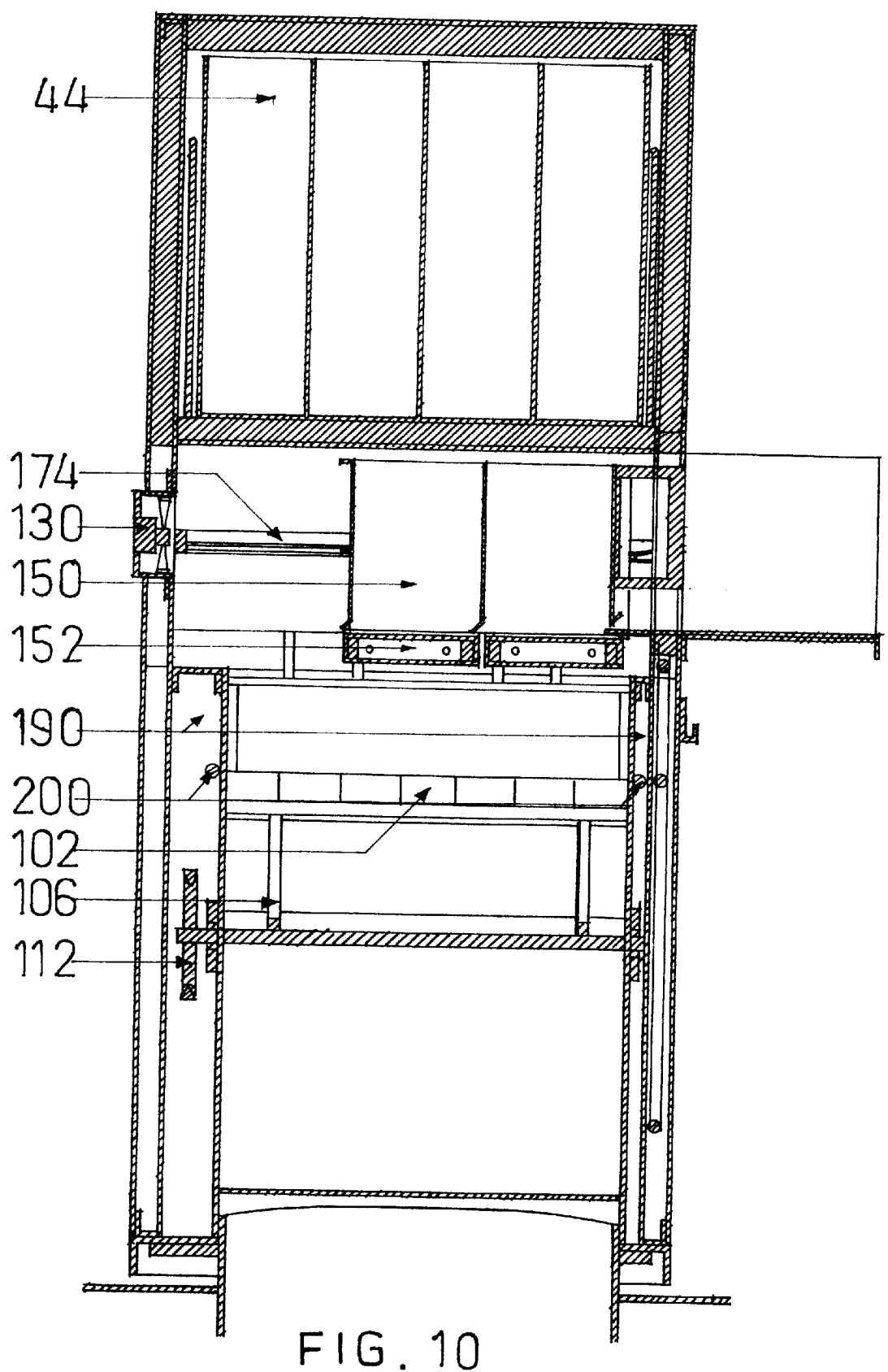
FIG. 10 is another front cross-sectional view of the preferred embodiment of the present invention automatic stir-fry machine shown in FIG. 1, taken along line 10—10 of FIG. 3.
Figure 11:
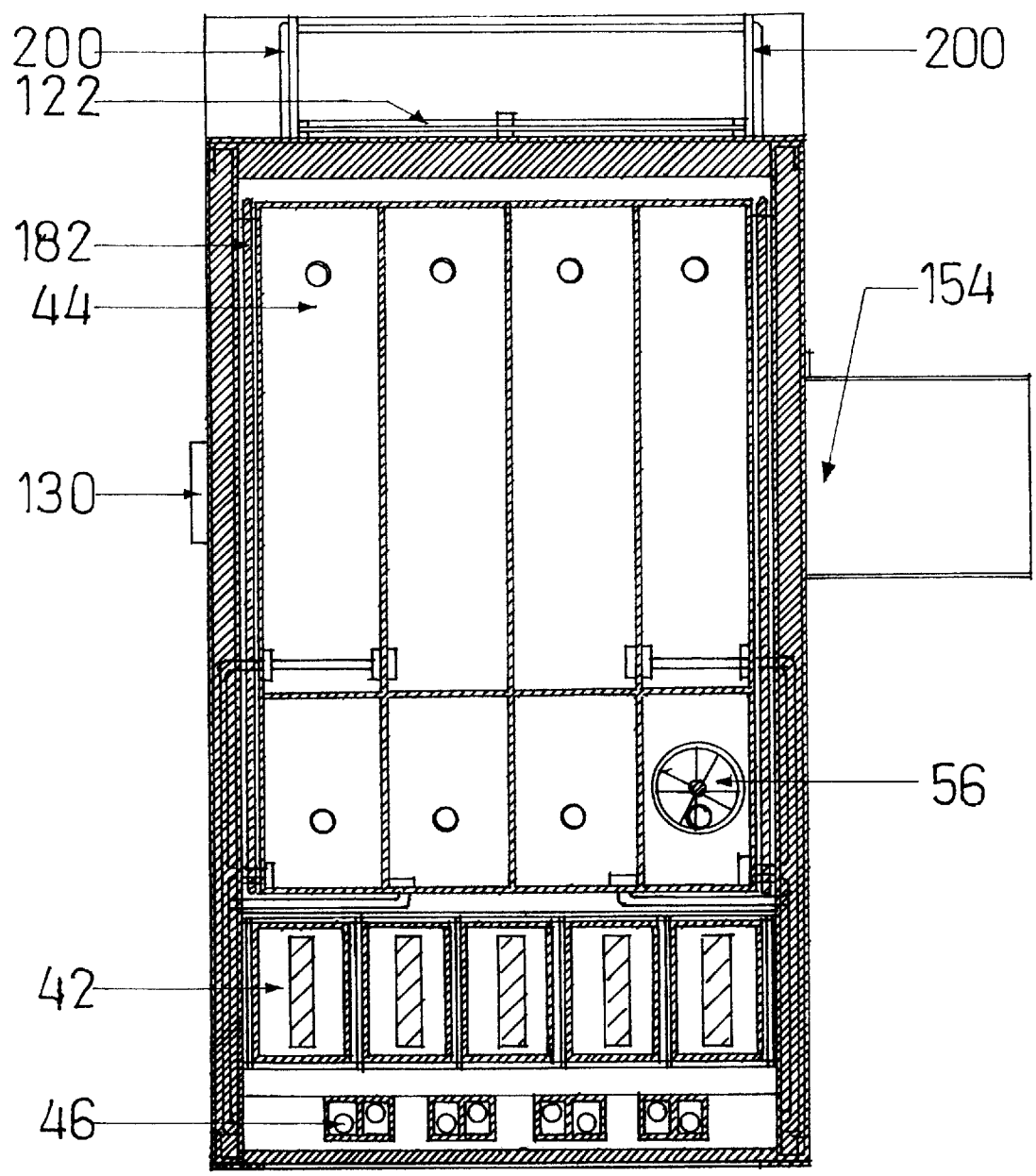
FIG. 11 is a top cross-sectional view of the preferred embodiment of the present invention automatic stir-fry machine shown in FIG. 1, taken along line 11—11 of FIG. 4.

Referring to FIGS. 1 through 13, particularly FIG. 10, there is shown that in the present invention automatic stir-fry machine 10, the sliding movement of the main ingredient containers 150 are guided by sliding tracks 174. In addition, air insulation layer 190 is provided for improve the heat insulation of the machine. Further, cooling water nozzles and pipes 200 are provided for reducing the internal temperature of the machine.

Figure 12:
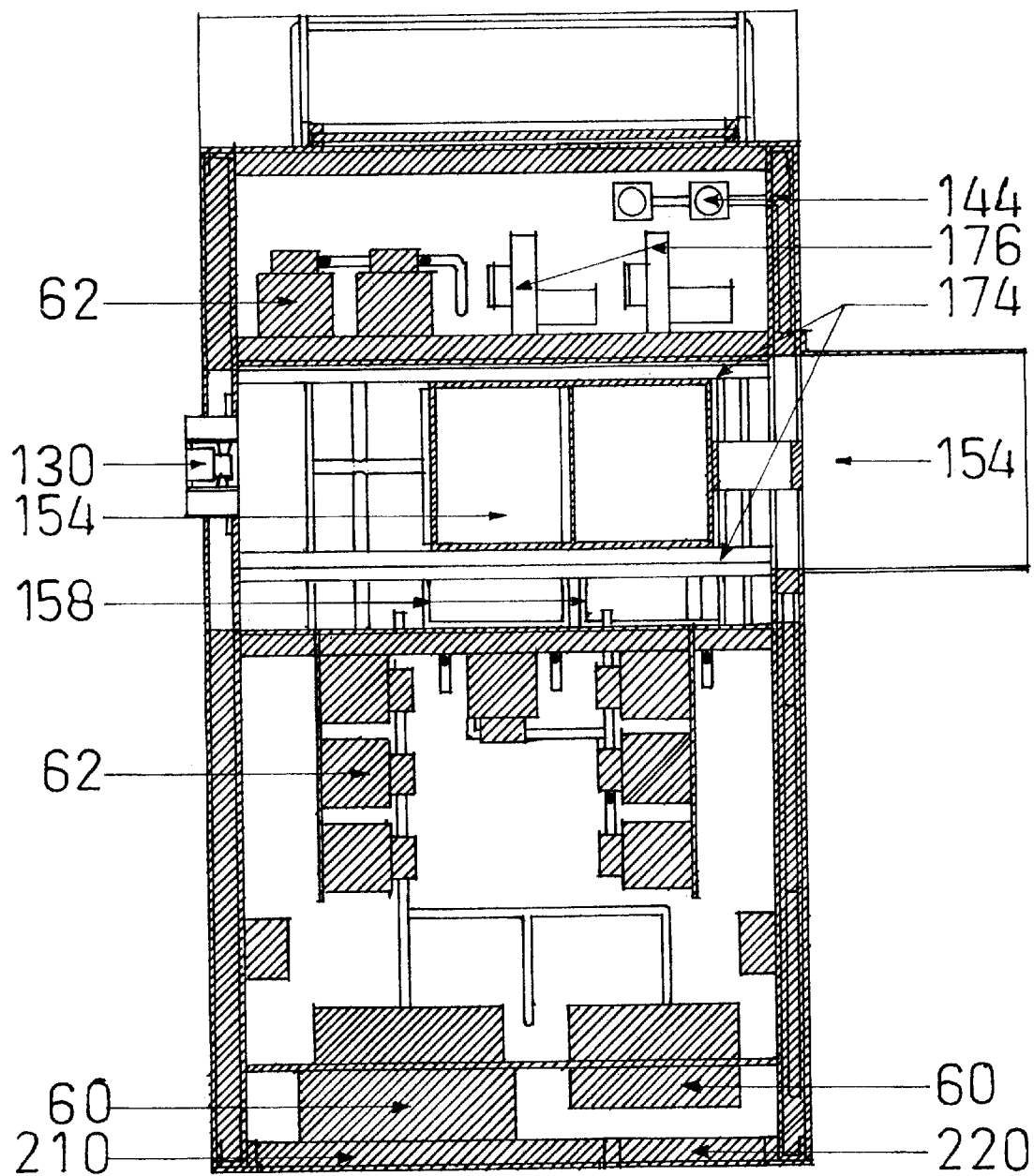
FIG. 12 is also a top cross-sectional view of the preferred embodiment of the present invention automatic stir-fry machine shown in FIG. 1, taken along line 12—12 of FIG. 4.

Referring to FIGS. 1 through 13, particularly FIG. 12, the present invention automatic stir-fry machine 10 has a set of manual switches 210 for manual operation of the machine. In addition, it has a keyboard or input key panel 220 for the operator to type in operating instructions or make operating selections for automatic operation of the machine. Of course other types of input devices, such as mouse, touch screen, voice recognition device, etc., or their combination, may be utilized for achieving the same or similar purposes.

Figure 13:
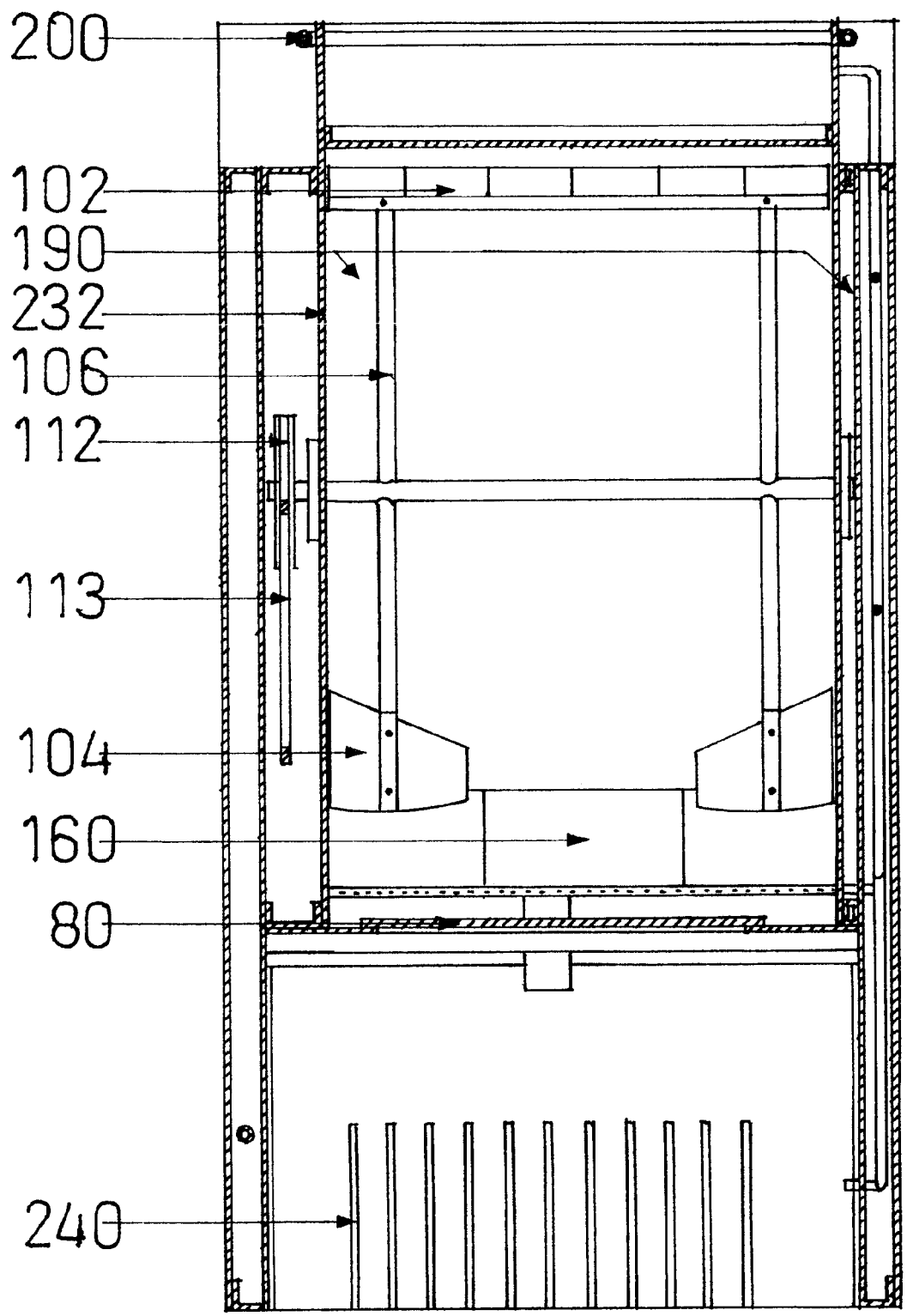
FIG. 13 is another top cross-sectional view of the preferred embodiment of the present invention automatic stir-fry machine shown in FIG. 1, taken along line 13—13 of FIG. 4.

Referring to FIGS. 1 through 13, particularly FIG. 13, the cooking chamber 30 of the present invention automatic stir-fry machine 10 is enclosed on both sides by vertical walls 232. The front operating area 20 also has a slotted bottom plate 240 for water drainage.

Referring to FIGS. 1 through 13 and also FIGS. 14a and 14b, there is shown the powder/particle condiment delivery arrangement of the present invention automatic stir-fry machine 10. For each powder/particle condiment container 42, a motor 252 is provided which is supported by a motor frame 254 for driving a helical propeller 256 for delivery of the powder/particle condiment contained in the container 42 through a delivery pipe 258.

Referring to FIGS. 1 through 13 and also FIGS. 15a through 15c, there is shown the burner adaptor assembly of the present invention automatic stir-fry machine 10, which includes an upper plate 262, a lower plate 264 and a set of screws. The purpose of the adaptor assembly is to attach the automatic stir-fry machine 10 to the existing burner ring 6 to form the enclosed combustion chamber 16 under the cooking chamber 30 of the automatic stir-fry machine 10. Obviously the burner adaptor assembly may be modified to fit various burner tops of different commercial burners.

Figure 16:
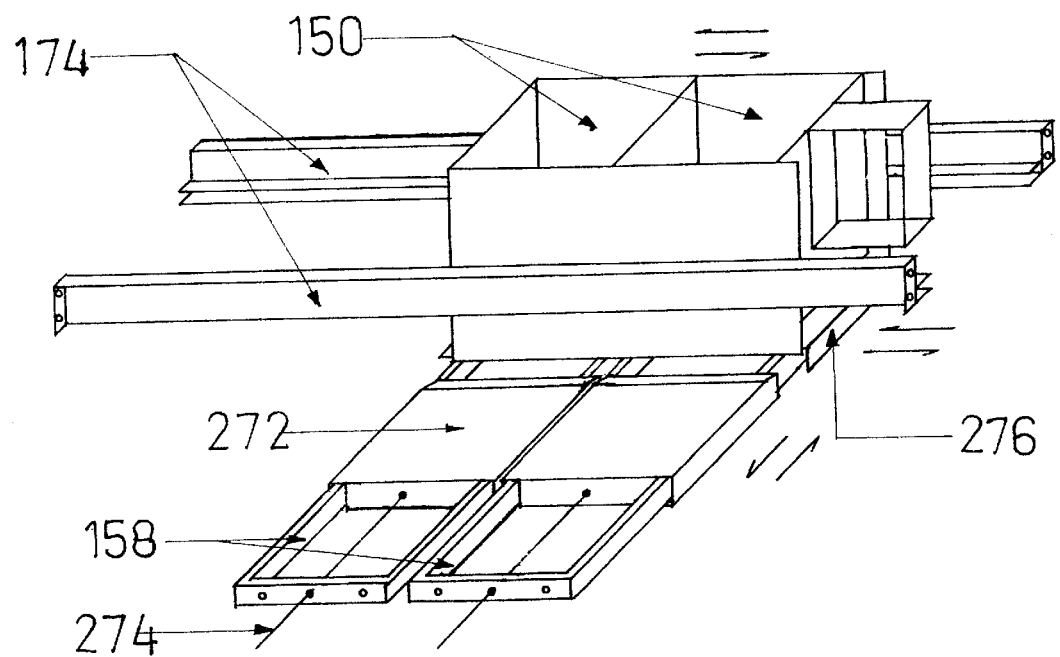
FIG. 16 is a prospective view of a preferred embodiment of the main ingredient delivery mechanism of the present invention automatic stir-fry machine.

Referring to FIGS. 1 through 13 and also FIG. 16, there is shown the main ingredient delivery assembly of the present invention automatic stir-fry machine 10. Each main ingredient container 150 is slidably suspended on a pair of tracks 174. Under the main ingredient containers 150 there are automatic doors 272 that are slidably mounted on parallel tracks 158 and are driven by cables 274 for allowing the delivery of the main ingredients.

Figures 17A, 17B:
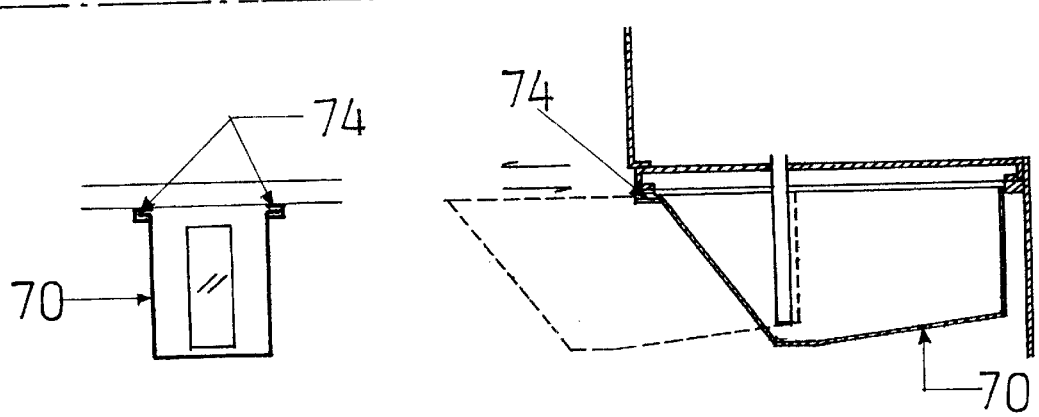
FIG. 17a is a front elevation view of a preferred embodiment of the temporary ingredient delivery mechanism of the present invention automatic stir-fry machine.
FIG. 17b is a side elevation view of a preferred embodiment of the temporary ingredient delivery mechanism of the present invention automatic stir-fry machine.
Figure 18A:
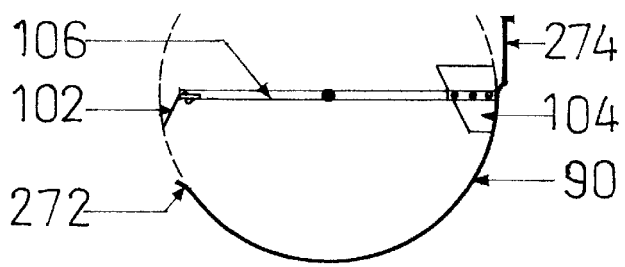
FIG. 18a is a partial side cross-sectional view of a preferred embodiment of the cooking vessel and slice assembly of the present invention automatic stir-fry machine.
Figure 18D:
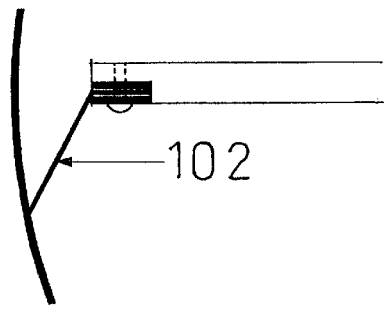
FIG. 18d is a partial enlarged side cross-sectional view of a preferred embodiment of the scraping slice of the present invention automatic stir-fry machine.
Figure 18B:
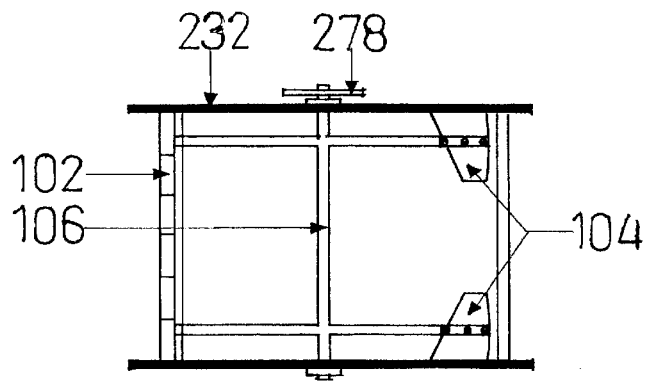
Figure 18E:
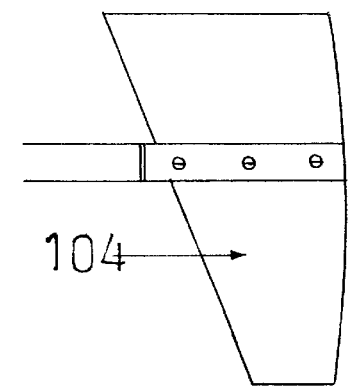
FIG. 18e is a partial enlarged side elevation view of a preferred embodiment of the stirring slice of the present invention automatic stir-fry machine.
Figure 18C:
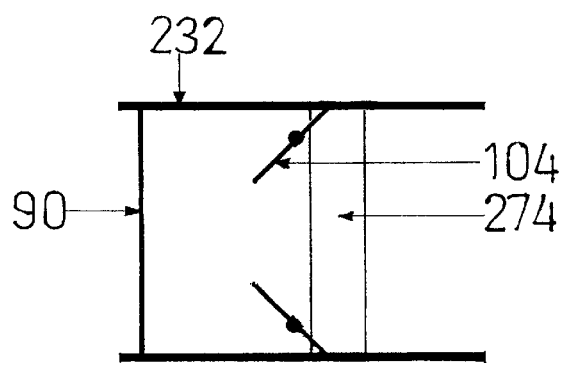
Figure 18F:
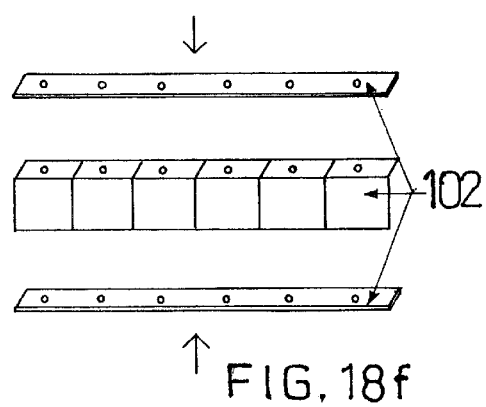
FIG. 18f is an exploded perspective view of the preferred embodiment of the scraping slice of the present invention automatic stir-fry machine.

Referring to FIGS. 1 through 13 and also FIGS. 17a and 17b, there is shown the temporary liquid condiment container 70 and its suspension arrangement which includes a pair of sliding tracks 74. The temporary liquid condiment delivery tube 76 also serves as a stopper for preventing the temporary liquid condiment container 70 to slide out off the suspension tracks 74.

Referring to FIGS. 1 through 13 and also FIGS. 18a through 18f, there is shown the slice assembly of the present invention automatic stir-fry machine 10. The slice assembly includes the scraping slice 102 and the stirring slice 104. The scraping slice 102 and the stirring slice 104 are mounted on the slice frame 106 to rotate inside the cooking vessel 90. The scraping slice 102 are made of thin metal plates that have spring tensions which ensure close contact with the bottom of the cooking vessel 90. The stirring slices are mounted in diagonal relationship with the side plates 232 of the cooking vessel. When rotated, the scraping slice 102 and stirring slice 104 work together to constantly and evenly mix and stir the food items being cooked within the cooking vessel 90 and preventing the food items from sticking to the cooking vessel 90. A vertical plate 274 is provided at the back of the cooking vessel 90 for preventing the food items from spilling over. Additional side plates 276 are provided in the cooking chamber 30 to form an air heat-insulation layer 190.

Figure 19A:
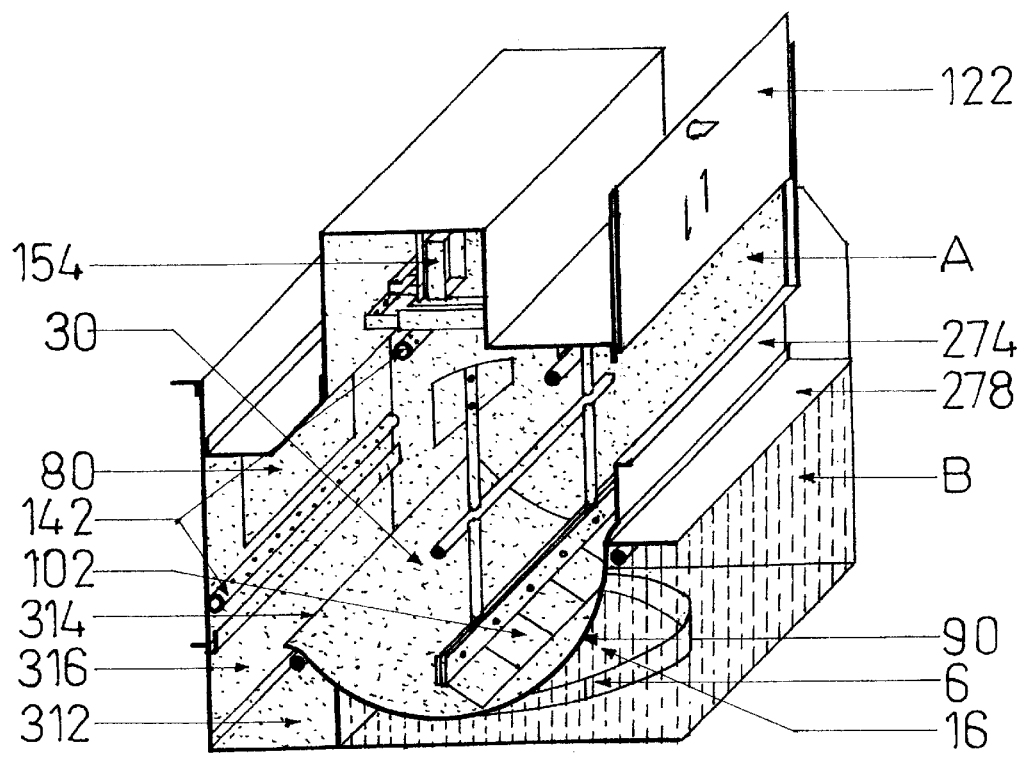
FIG. 19a is a perspective view of a preferred embodiment of the cooking chamber of the present invention automatic stir-fry machine.
Figures 19B, 19C:
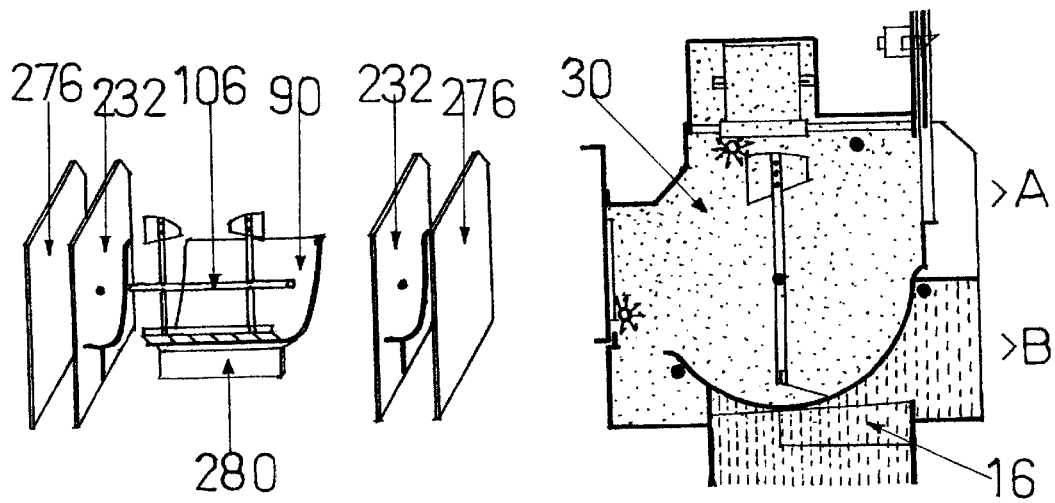

Referring to FIGS. 1 through 13 and also FIGS. 19a through 19c, there is shown the cooking chamber arrangement of the present invention automatic stir-fry machine 10. Between the exhaust port A of the cooking chamber 30 and the exhaust port B of the combustion chamber 16, there is provided a fire-separation board 278, in addition to a front fire-separation board 280 (shown in FIG. 19b). The automatic fire-extinguish plate 122 can be dropped to close the exhaust port A in case of fire inside the cooking chamber 30.

Referring to FIGS. 1 through 13 and also FIGS. 20a through 20d, there is shown the powder/particle and liquid condiment storage and delivery arrangement of the present invention automatic stir-fry machine 10. A connection tube 292 is provided between each liquid condiment container 44 and its corresponding volume display tube 46. Each powder/particle condiment container 42 is provided with a dry condiment delivery conduit 294.

Similarly, each liquid condiment container 44 is provided with a liquid condiment delivery conduit 296. The starch stirrer 56 includes a small motor 302 which is mounted on a motor frame 304 and drives a stirrer head 308 through a shaft 306.

Referring to FIGS. 1 through 13 and also FIGS. 21a and 21b, there is shown the cooked food delivery arrangement of the present invention automatic stir-fry machine 10. A cooked container 312 can be inserted through a cooked food delivery port 314 where a flip-open plate 316 is provided as a door. The food delivery port door 316 is spring biased to automatically return to its vertical position to close the food delivery port 314 after the cooked food container 312 is withdrawn.

Figure 22A:
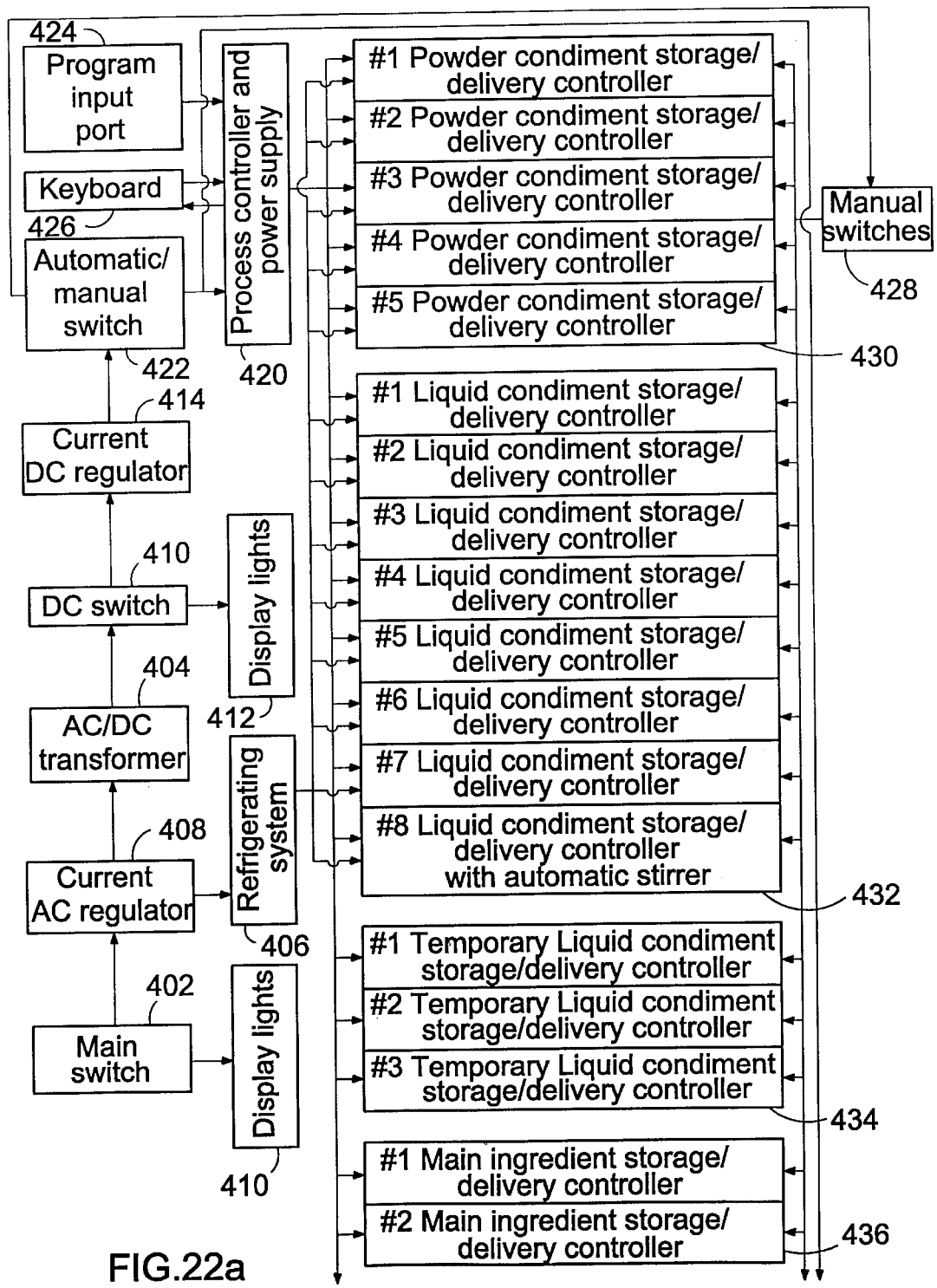
FIGS. 22a and 22b form an illustrative block diagram showing the main control and functional elements of a preferred embodiment of the present invention automatic stir-fry machine.
Figure 22B:
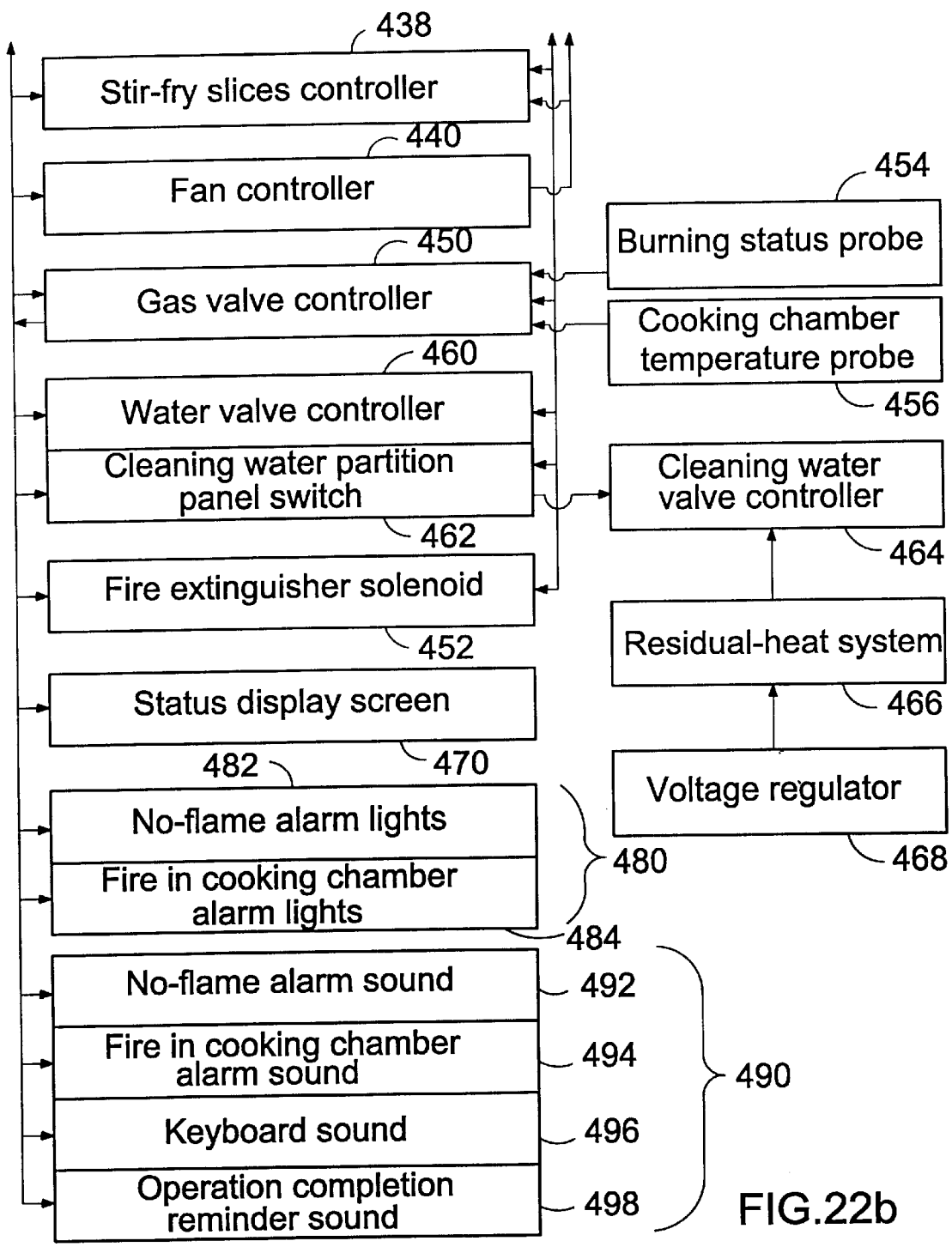

Referring to FIGS. 1 through 21b and also FIGS. 22a and 22b, there is shown an illustrative block diagram showing the main control and functional elements of a preferred embodiment of the present invention automatic stir-fry machine 10.

The automatic stir-fry machine 10 has a main switch 402 for the AC/DC transformer 404 and its refrigerating system 406 through an AC current regulator 408. Visual display lights 410 are provided to indicate the status of the main switch 402.

The automatic stir-fry machine 10 has a DC switch 412 for switching on and off the component elements of the machine that run on DC power. Visual display lights 412 are also provided to indicate the status of the DC switch 410. A DC current regulator 414 is provided for regulating the DC current from the AC/DC transformer 404.

The automatic stir-fry machine 10 has a process controller and power supply unit 420 that can be switched on or off by an automatic or manual switch 422. The process controller and power supply unit 420 has a computer program input port 424 for loading computer software program instructions into the process controller and power supply unit 420.

The process controller and power supply unit 420 also has a keyboard and/or other input devices 426 for the operator to input instructions and/or make selections to the process controller and power supply unit 420.

In addition, manual switches 428 are provided for individually switching on or off each component element of the automatic stir-fry machine 10.

The process controller 420 controls the operation of the sub-controllers of individual components, including a set of powder/particle condiment storage/delivery controllers 430, a set of liquid condiment storage/delivery controllers 432, a set of temporary liquid condiment storage/delivery controllers 434, a set of main ingredient storage/delivery controllers 436, a slice controller 438, a circulation fan controller 440, a gas valve controller 450, a fire extinguisher solenoid 452, and a water valve controller 460.

The gas valve controller 450 is connected to a burning status probe 454 and a cooking chamber temperature probe 456. If either probe detects an abnormal condition, then the gas valve controller 450 will cause the gas valve to be shut off.

The process controller 420 also controls the operation of a cleaning water partition panel switch 462, which is in turn connected to a cleaning water valve controller 464. A residual-heat system 466 protected by a voltage regulator 468 utilizes the residual heat at the exhaustion ports of the automatic stir-fry machine to warm up cleaning water for rinsing and cleaning the cooking chamber of the machine. The residual-heat system 466 is connected to the cleaning water valve controller 464. When the cleaning water valve is turned on, the cleaning water partition plate switch 462 will deploy a partition plate to prevent water splash.

The process controller 420 further controls the operation of a status display screen 470, a set of visual alarm lights 480 which may include a no-flame alarm light 482 and a fire inside cooking chamber alarm light 484, and a set of audible alarm sound generating devices 490 which may include a no-flame alarm sound generating device 492, a fire inside cooking chamber alarm sound generating device 494, a keyboard sound generating device 496, and a operation completion reminder sound generating device 498.

Referring to FIGS. 1 through 21*b* and also FIGS. 23*a* and 23*b*, there is shown an illustrative block diagram showing the main structural and operational components of a preferred embodiment of the present invention automatic stir-fry machine 10.

These main structural and operational components include a powder/particle condiment storage and delivery system 510, a condiment storage and delivery system 520, a temporary condiment storage and delivery system 530, a main ingredient storage and delivery system 540, a water supply system 550, a stir-fry and self-cleaning system 560, a gas burner control and safety system 580 and a cooling and humidity control system 590.

The powder/particle condiment storage and delivery system 510 further includes DC 12 volt low speed motor units 512, powder/particle condiments container units 514, delivery conduit assemblies 516, and delivery propeller assemblies 518.

The condiment storage and delivery system 520 further includes DC 12 volt flow control pump units 521, liquid condiment container units 523, liquid conduits and connector assemblies 525, liquid volume display tube assemblies 527, and liquid condiment filter assemblies 529.

The temporary condiment storage and delivery system 530 further includes DC 12 volt flow control pump units 531, temporary liquid condiment container units 533, temporary liquid condiment container track and suspension assemblies 535, temporary liquid conduits and connector assemblies 537, and temporary liquid condiment filter assemblies 539.

The main ingredient storage and delivery system 540 further includes main ingredient container units 541, main ingredient container track and suspension assemblies 542, and automatic main ingredient delivery door mechanisms 543.

The automatic main ingredient delivery door mechanism 543 further includes flip-flop floors 545, floor track assemblies 546, low speed motor units 547, cable pulling assemblies 548, and restoring assemblies 549.

The water supply system 550 further includes DC 12 volt valves 552 and water conduit assemblies 554.

The stir-fry and self-cleaning system 560 includes a DC 12 volt motor unit 562, gear assemblies 563 and bearings 564, a slice support frame structure 566, a scraping slice assembly 567, and a stirring slice assembly 568, The stir-fry and self-cleaning system 560 also includes a cooked food container unit 572, and a cooked food output door assembly with cooked food container presence sensor switch 574.

The stir-fry and self-cleaning system 560 further includes cleaning water pipe assemblies 576, DC 12 volt cleaning water valves 577, and cleaning water conduit and pressure regulating valve assemblies 578.

The gas burner control and safety system 580 further includes a DC 12 volt automatic gas valve unit 582, an automatic gas shut-off device 584, cooking chamber temperature sensor units 586, and a fire extinguisher plate solenoid assembly 588.

The cooling and humidity control system 590 further includes DC 12 volt air circulating fans and air circulating conduit assemblies 592, and an automatic sprinkler system 594.

Figure 24:
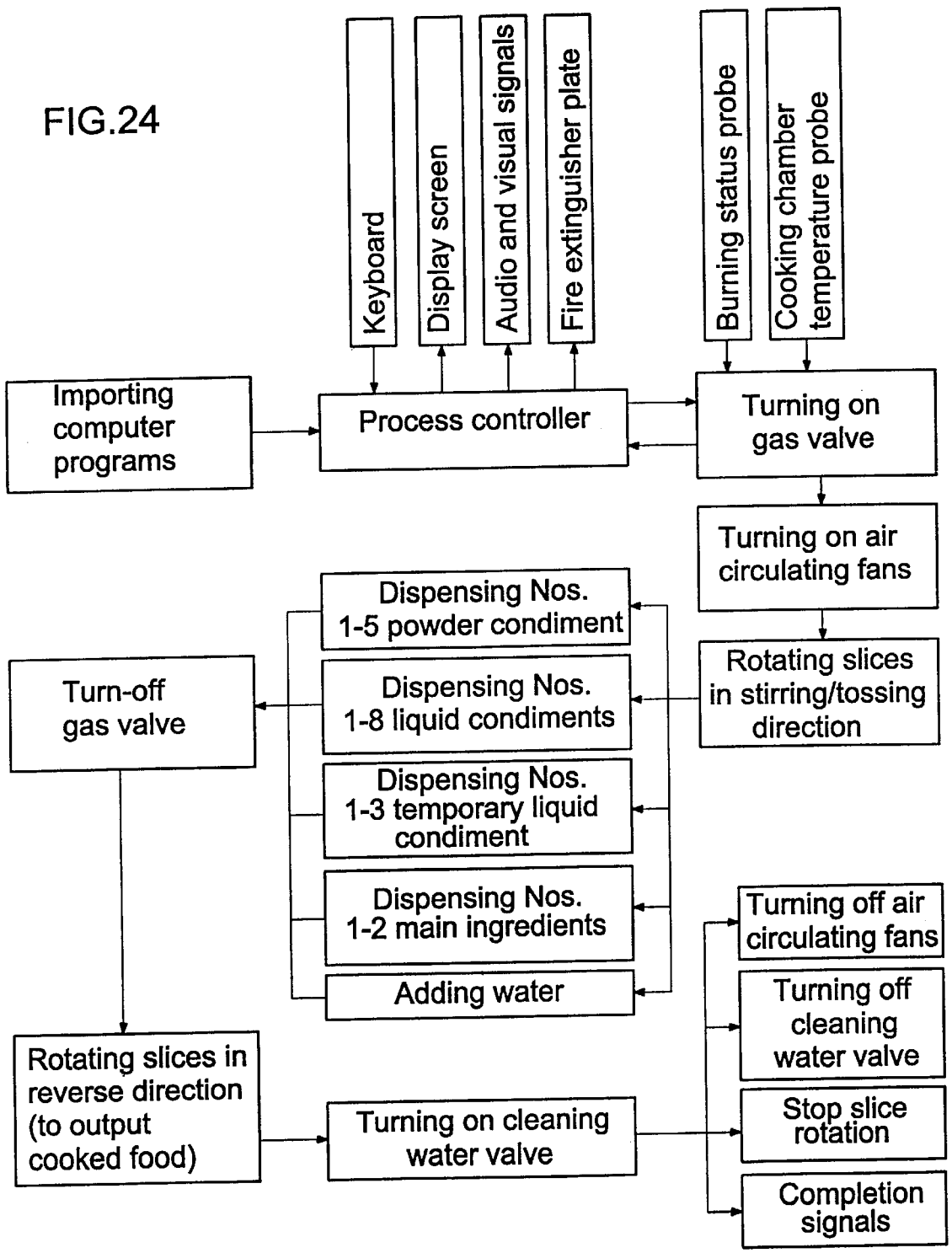
FIG. 24 is an illustrative flow-chart diagram showing one of the preferred embodiments of the main processing steps and sequence of the present invention automatic stir-fry machine.

Referring to FIGS. 1 through 23*b* and also FIG. 24, there is an illustrative flow-chart diagram showing one of the preferred embodiments of the main processing steps and operating sequence of the present invention automatic stir-fry machine 10.

The process begins at the importation of computer program instructions, including menu selections, etc., into the process controller. The process controller is connected to the keyboard and the display screen and also provides audio and visual signals to the operator.

Once everything is ready, the gas valve and air circulation fans are turned on. The scraping and stirring slices are rotated in a stirring and tossing direction, while the powder/particle and liquid condiments and the main ingredients are dispensed into the cooking vessel, along with water (if required).

After stirring and tossing for a pre-determined period of time, the dish is cooked and the gas valve is turned off. The scraping and stirring slices are now rotated in a reverse direction to output the cooked food. Then the cleaning water us turned on for cleaning the cooking vessel.

Finally the air circulation fans and cleaning water valves are turned off and the rotation of the slices are stopped, and a audio and/or visual signal is generated to notify the operation that the cooking is completed.

At any time during the cooking process, the burning status and cooking chamber temperature are probed and upon the detection of any abnormal condition, the gas valve will be turned off and the process controller will cause the fire extinguisher plate to be activated if necessary to extinguish any fire inside the cooking chamber.

The present invention automatic stir-fry machine has many unique features and important advantages. The automatic stir-fry machine is designed to be attached to and positioned above a commercial burner and has closed combustion and cooking chambers that greatly improves energy efficiency. It also has a unique cylindrical shaped cooking vessel and scraping and stirring slice assemblies that increase the effectiveness of stir-frying of the dishes being cooked. The automatic stir-fry machine automatically cooks Chinese stir-fry dishes under the control of a microprocessor controller. The operator can select the dish and quantity of food to be cooked from an extensive menu which can be pre-stored in the micro-processor. The automatic stir-fry machine has separate storage and delivery assemblies for the main ingredients and various powder/particle or liquid condiments with display windows or level indicators for dispensing the ingredients and condiments in a precise and timely manner. The automatic stir-fry machine achieves the much desired uniformity of the taste, quality and standard of the cooked dishes. It further comes with an automatic cleaning system and various fire safety devices.

Defined in detail, the present invention is an automatic stir-fry machine to be placed on a burner for cooking stir-fry dishes, comprising: (a) an adaptor assembly for mounting the automatic stir-fry machine on the burner, forming a closed combustion chamber under the automatic stir-fry machine with only a rear exhaustion port; (b) a closed cooking chamber in a lower portion of the automatic stir-fry machine with only a rear exhaustion port, containing a cooking vessel formed primarily by two oppositely spaced apart vertical sidewalls and a generally cylindrical shaped bottom having a horizontal central axis; ©) a slice assembly supported inside the cooking vessel and having a transverse scraping slice contacting the bottom of the cooking vessel with spring tension, and a pair of oppositely spaced apart and diagonally oriented stirring slices contacting opposite corners of the cooking vessel where the cylindrical bottom and the sidewalls join, the scraping and stirring slices rotatable about the horizontal central axis of the cylindrical bottom of the cooking vessel in one direction for stirring, tossing and mixing food items being cooked in the cooking vessel and also in a reverse direction for outputting cooked food items from the cooking vessel; (d) a multiplicity of storage and delivery systems located in an upper portion of the automatic stir-fry machine for containing ingredients and condiments and dispensing pre-determined amounts of the ingredients and condiments into the cooking vessel at pre-determined times for cooking the stir-fry dishes; (e) a combustion control and safety system having an automatic fire extinguish assembly for closing the exhaust port of the cooking chamber in case of fire inside the cooking chamber; (f) a micro-controller unit located in a front portion of the automatic stir-fry machine for controlling the automatic cooking operation of the automatic stir-fry machine; and (g) input devices connected to the micro-processor unit for loading computer software programs and making cooking process instructions and selections.

Defined broadly, the present invention is an automatic stir-fry machine to be placed on a burner for cooking stir-fry dishes, comprising: ©) an adaptor assembly for mounting the automatic stir-fry machine on the burner, forming a closed combustion chamber under the automatic stir-fry machine with only a rear exhaustion port; (b) a closed cooking chamber in a lower portion of the automatic stir-fry machine with only a rear exhaustion port, containing a cooking vessel formed primarily by two oppositely spaced apart vertical sidewalls and a generally cylindrical shaped bottom having a horizontal axis; ©) a slice assembly supported inside the cooking vessel and rotatable about the horizontal axis of the cylindrical bottom of the cooking vessel, including a transverse scraping slice contacting the bottom of the cooking vessel with spring tension, and a pair of oppositely spaced apart and diagonally oriented stirring slices contacting opposite corners of the cooking vessel where the cylindrical bottom and the sidewalls join, for stirring, tossing and mixing food items inside the cooking vessel; (d) a multiplicity of storage and delivery systems located in an upper portion of the automatic stir-fry machine for containing ingredients and condiments and dispensing pre-determined amounts of the ingredients and condiments into the cooking vessel at pre-determined times for cooking the stir-fry dishes; and (e) a micro-controller located in a front portion of the automatic stir-fry machine for controlling the automatic cooking operation of the automatic stir-fry machine.

Defined more broadly, the present invention is an automatic stir-fry machine to be placed on a burner for cooking stir-fry dishes, comprising: (a) a closed cooking chamber with only a rear exhaustion port, containing a cooking vessel formed primarily by two oppositely spaced apart vertical sidewalls and a generally cylindrical shaped bottom having a horizontal axis; (b) a slice assembly supported inside the cooking vessel and rotatable about the horizontal axis of the cylindrical bottom of the cooking vessel, including a transverse scraping slice contacting the bottom of the cooking vessel with spring tension, and a pair of oppositely spaced apart and diagonally oriented stirring slices contacting opposite corners of the cooking vessel where the cylindrical bottom and the sidewalls join, for stirring, tossing and mixing food items inside the cooking vessel; ©) a multiplicity of storage and delivery systems for containing ingredients and condiments and dispensing pre-determined amounts of the ingredients and condiments into the cooking vessel at pre-determined times for cooking the stir-fry dishes; and (d) means for controlling the automatic cooking operation of the automatic stir-fry machine.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An automatic stir-fry machine to be placed on a burner for cooking stir-fry dishes, comprising:

a. an adaptor assembly for mounting said automatic stir-fry machine on said burner, forming a closed combustion chamber under said automatic stir-fry machine with only a rear exhaustion port;

b. a closed cooking chamber in a lower portion of said automatic stir-fry machine with only a rear exhaustion port, containing a cooking vessel formed primarily by two oppositely spaced apart vertical sidewalls and a generally cylindrical shaped bottom having a horizontal central axis;

c. a slice assembly supported inside said cooking vessel and having a transverse scraping slice contacting said bottom of said cooking vessel with spring tension, and a pair of oppositely spaced apart and diagonally oriented stirring slices contacting opposite corners of said cooking vessel where said cylindrical bottom and said sidewalls join, the scraping and stirring slices rotatable about said horizontal central axis of said cylindrical bottom of said cooking vessel in one direction for stirring, tossing and mixing food items being cooked in said cooking vessel and also in a reverse direction for outputting cooked food items from said cooking vessel;

d. a multiplicity of storage and delivery systems located in an upper portion of said automatic stir-fry machine for containing ingredients and condiments and dispensing pre-determined amounts of said ingredients and condiments into said cooking vessel at pre-determined times for cooking said stir-fry dishes;

e. a combustion control and safety system having an automatic fire extinguish assembly for closing said exhaust port of said cooking chamber in case of fire inside said cooking chamber;

f. a micro-controller unit located in a front portion of said automatic stir-fry machine for controlling the automatic cooking operation of said automatic stir-fry machine; and g. input devices connected to said micro-processor unit for loading computer software programs and making cooking process instructions and selections.

2. The automatic stir-fry machine in accordance with claim 1, wherein said multiplicity of storage and delivery systems comprises a plurality of dry condiment storage and delivery systems.

3. The automatic stir-fry machine in accordance with claim 1, wherein said multiplicity of storage and delivery systems comprises a plurality of liquid condiment storage and delivery systems.

4. The automatic stir-fry machine in accordance with claim 1, wherein said multiplicity of storage and delivery systems comprises a plurality of temporary liquid condiment storage and delivery systems.

5. The automatic stir-fry machine in accordance with claim 1, wherein said multiplicity of storage and delivery systems comprises a plurality of main ingredient storage and delivery systems.

6. The automatic stir-fry machine in accordance with claim 1, wherein said multiplicity of storage and delivery systems comprises a starch stirrer unit.

7. The automatic stir-fry machine in accordance with claim 1, further comprising a water supply system.

8. The automatic stir-fry machine in accordance with claim 1, further comprising a cooked food output assembly.

9. The automatic stir-fry machine in accordance with claim 1, further comprising a self-cleaning system.

10. The automatic stir-fry machine in accordance with claim 9, wherein said self-cleaning system comprises water pipes located near said exhaustion port of said combustion chamber for utilizing the residual heat thereof to heat water for cleaning purposes.

11. The automatic stir-fry machine in accordance with claim 1, further comprising a temperature and humidity control system.

12. The automatic stir-fry machine in accordance with claim 11, wherein said temperature and humidity control system comprises air circulating fans.

13. The automatic stir-fry machine in accordance with claim 11, wherein said temperature and humidity control system comprises an automatic sprinkler assembly.

14. The automatic stir-fry machine in accordance with claim 1, further comprising a refrigerating system for storing said condiments and ingredients at pre-determined low temperature ranges.

15. The automatic stir-fry machine in accordance with claim 1, further comprising audio and visual display devices for indicating cooking process status.

16. The automatic stir-fry machine in accordance with claim 1, further comprising audio and visual alarms for indicating abnormal conditions.

17. An automatic stir-fry machine to be placed on a burner for cooking stir-fry dishes, comprising:

a. an adaptor assembly for mounting said automatic stir-fry machine on said burner, forming a closed combustion chamber under said automatic stir-fry machine with only a rear exhaustion port;

b. a closed cooking chamber in a lower portion of said automatic stir-fry machine with only a rear exhaustion port, containing a cooking vessel formed primarily by two oppositely spaced apart vertical sidewalls and a generally cylindrical shaped bottom having a horizontal axis;

c. a slice assembly supported inside said cooking vessel and rotatable about said horizontal axis of said cylindrical bottom of said cooking vessel, including a transverse scraping slice contacting said bottom of said cooking vessel with spring tension, and a pair of oppositely spaced apart and diagonally oriented stirring slices contacting opposite corners of said cooking vessel where said cylindrical bottom and said sidewalls join, for stirring, tossing and mixing food items inside said cooking vessel;

d. a multiplicity of storage and delivery systems located in an upper portion of said automatic stir-fry machine for containing ingredients and condiments and dispensing pre-determined amounts of said ingredients and condiments into said cooking vessel at pre-determined times for cooking said stir-fry dishes; and e. a micro-controller located in a front portion of said automatic stir-fry machine for controlling the automatic cooking operation of said automatic stir-fry machine.

18. The automatic stir-fry machine in accordance with claim 17, wherein said multiplicity of storage and delivery systems comprises a plurality of dry condiment storage and delivery systems.

19. The automatic stir-fry machine in accordance with claim 17, wherein said multiplicity of storage and delivery systems comprises a plurality of liquid condiment storage and delivery systems.

20. The automatic stir-fry machine in accordance with claim 17, wherein said multiplicity of storage and delivery systems comprises a plurality of temporary liquid condiment storage and delivery systems.

21. The automatic stir-fry machine in accordance with claim 17, wherein said multiplicity of storage and delivery systems comprises a plurality of main ingredient storage and delivery systems.

22. The automatic stir-fry machine in accordance with claim 17, wherein said multiplicity of storage and delivery systems comprises a starch stirrer unit.

23. The automatic stir-fry machine in accordance with claim 17, further comprising a water supply system.

24. The automatic stir-fry machine in accordance with claim 17, further comprising a cooked food output assembly.

25. The automatic stir-fry machine in accordance with claim 17, further comprising a combustion control and safety system.

26. The automatic stir-fry machine in accordance with claim 25, wherein said combustion control and safety system comprising an automatic fire extinguish assembly for closing said exhaust port of said cooking chamber in case of fire inside said cooking chamber.

27. The automatic stir-fry machine in accordance with claim 17, further comprising a self-cleaning system.

28. The automatic stir-fry machine in accordance with claim 27, wherein said self-cleaning system comprises water pipes located near said exhaustion port of said combustion chamber for utilizing the residual heat thereof to heat water for cleaning purposes.

29. The automatic stir-fry machine in accordance with claim 17, further comprising a temperature and humidity control system.

30. The automatic stir-fry machine in accordance with claim 29, wherein said temperature and humidity control system comprises internal air circulating fans.

31. The automatic stir-fry machine in accordance with claim 29, wherein said temperature and humidity control system comprises automatic sprinkler assemblies.

32. The automatic stir-fry machine in accordance with claim 17, further comprising a refrigerating system for storing said condiments and ingredients at pre-determined low temperature ranges.

33. The automatic stir-fry machine in accordance with claim 17, wherein said scraping slice and stirring slices of said slice assembly can be rotated about said horizontal central axis of said cylindrical bottom of said cooking vessel in one direction for stirring food items being cooked in said cooking vessel and then in a reverse direction for outputting cooked food items from said cooking vessel.

34. The automatic stir-fry machine in accordance with claim 17, further comprising input devices for loading computer software programs and making cooking process instructions and selections.

35. The automatic stir-fry machine in accordance with claim 17, further comprising audio and visual display devices for indicating cooking process status.

36. The automatic stir-fry machine in accordance with claim 17, further comprising audio and visual alarm devices for indicating abnormal conditions.

37. An automatic stir-fry machine to be placed on a burner for cooking stir-fry dishes, comprising:

a. a closed cooking chamber with only a rear exhaustion port, containing a cooking vessel formed primarily by two oppositely spaced apart vertical sidewalls and a generally cylindrical shaped bottom having a horizontal axis;

b. a slice assembly supported inside said cooking vessel and rotatable about said horizontal axis of said cylindrical bottom of said cooking vessel, including a transverse scraping slice contacting said bottom of said cooking vessel with spring tension, and a pair of oppositely spaced apart and diagonally oriented stirring slices contacting opposite corners of said cooking vessel where said cylindrical bottom and said sidewalls join, for stirring, tossing and mixing food items inside said cooking vessel;

c. a multiplicity of storage and delivery systems for containing ingredients and condiments and dispensing pre-determined amounts of said ingredients and condiments into said cooking vessel at pre-determined times for cooking said stir-fry dishes; and d. means for controlling the automatic cooking operation of said automatic stir-fry machine.

38. The automatic stir-fry machine in accordance with claim 37, further comprising an adaptor assembly for mounting said automatic stir-fry machine on said burner, forming a closed combustion chamber under said automatic stir-fry machine with only a rear exhaustion port.

39. The automatic stir-fry machine in accordance with claim 37, wherein said multiplicity of storage and delivery systems comprises a starch stirrer unit.

40. The automatic stir-fry machine in accordance with claim 37, further comprising a cooked food output assembly.

41. The automatic stir-fry machine in accordance with claim 37, further comprising a combustion control and safety system having an automatic fire extinguish assembly for closing said exhaust port of said cooking chamber in case of fire inside said cooking chamber.

42. The automatic stir-fry machine in accordance with claim 38, further comprising a self-cleaning system having water pipes located near said exhaustion port of said combustion chamber for utilizing the residual heat thereof to heat water for cleaning purposes.

43. The automatic stir-fry machine in accordance with claim 37, further comprising a temperature and humidity control system.

44. The automatic stir-fry machine in accordance with claim 37, further comprising a refrigerating system for storing said condiments and ingredients at pre-determined low temperature ranges.

45. The automatic stir-fry machine in accordance with claim 37, further comprising audio and visual display devices for indicating cooking process status.

46. The automatic stir-fry machine in accordance with claim 37, further comprising audio and visual alarm devices for indicating abnormal conditions.

* * * * *